United States Patent
Cheon et al.

(10) Patent No.: US 8,687,022 B2
(45) Date of Patent: Apr. 1, 2014

(54) METHOD FOR GENERATING DIGITAL CONTENT BY COMBINING PHOTOGRAPHS AND TEXT MESSAGES

(75) Inventors: Ka-won Cheon, Seoul (KR); Say Jang, Gyeonggi-do (KR); Kuk-hyun Han, Gyeonggi-do (KR); Taik-heon Rhee, Seoul (KR); Pil-seung Yang, Gyeonggi-do (KR); Seung-hwan Hong, Gyeonggi-do (KR); Su-jin Yeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 624 days.

(21) Appl. No.: 12/976,341

(22) Filed: Dec. 22, 2010

(65) Prior Publication Data

US 2011/0157225 A1 Jun. 30, 2011

(30) Foreign Application Priority Data

Dec. 24, 2009 (KR) ........................ 10-2009-0131058

(51) Int. Cl.
*G09G 5/00* (2006.01)

(52) U.S. Cl.
USPC .......................................... 345/636; 715/225

(58) Field of Classification Search
USPC .................................. 345/636, 629; 715/225
See application file for complete search history.

(56) References Cited

U.S. PATENT DOCUMENTS

| | | | | |
|---|---|---|---|---|
| 5,038,392 A | * | 8/1991 | Morris et al. | 382/175 |
| 6,202,073 B1 | * | 3/2001 | Takahashi | 715/204 |
| 7,779,355 B1 | * | 8/2010 | Erol et al. | 715/273 |
| 7,974,496 B2 | * | 7/2011 | Tighe | 382/298 |
| 2002/0135685 A1 | * | 9/2002 | Tsunoda | 348/231.2 |
| 2004/0076342 A1 | * | 4/2004 | Wolff et al. | 382/294 |
| 2004/0117627 A1 | * | 6/2004 | Brewington | 713/176 |
| 2005/0076295 A1 | * | 4/2005 | Simske et al. | 715/517 |
| 2005/0228683 A1 | * | 10/2005 | Saylor et al. | 705/1 |
| 2006/0204135 A1 | * | 9/2006 | Funakura | 382/291 |
| 2006/0206807 A1 | * | 9/2006 | Rosner et al. | 715/515 |
| 2006/0262976 A1 | * | 11/2006 | Hart et al. | 382/190 |
| 2009/0016605 A1 | * | 1/2009 | Chao et al. | 382/176 |
| 2011/0202826 A1 | * | 8/2011 | Shimizu | 715/230 |
| 2012/0154608 A1 | * | 6/2012 | Ko | 348/207.11 |

FOREIGN PATENT DOCUMENTS

KR 100913379 8/2009
KR 1020090102530 9/2009

* cited by examiner

*Primary Examiner* — Maurice L McDowell, Jr.
(74) *Attorney, Agent, or Firm* — The Farrell Law Firm, P.C.

(57) ABSTRACT

A method for generating digital content where an intermediary figure included in an inputted image is perceived, a digital object is inserted into a location where the intermediary figure is displayed, and digital content, which is the image into which the digital object is inserted, is displayed. Accordingly, the user can generate digital content easily using a touch screen.

14 Claims, 52 Drawing Sheets

METHOD FOR GENERATING DIGITAL CONTENT BY COMBINING PHOTOGRAPHS AND TEXT MESSAGES

PRIORITY

This application claims priority under 35 U.S.C. §119(a) to Korean Patent Application No. 10-2009-0131058, filed on Dec. 24, 2009, in the Korean Intellectual Property Office, the disclosure of which is incorporated herein by reference.

BACKGROUND OF THE INVENTION

1. Field of the Invention

The present invention relates generally to a method for generating digital content, and more particularly, to a method for generating digital content by combining a variety of photos and texts.

2. Description of the Related Art

Recently, the use of large-sized displays has rapidly increased, and a variety of devices implementing large-sized displays such as electronic blackboards, electronic tables, and the like have been developed.

In many cases, the large-sized displays are not accompanied with separate input devices, but rely on built in touch screens which operate to receive user selection. For example, an electronic blackboard or electronic table receives user commands through the user touching the touch screen.

Increasingly, displays receive input through touch screens only as the devices such as tablets or full-touch mobile phones implementing touch screens have increasingly been made available.

However, as the use of various display devices implementing touch screens is becoming more common, users are frequently required to make and use content using only a touch screen.

Accordingly, a method is necessary, which allows a user to make content on a display apparatus implementing a touch screen with ease.

SUMMARY OF THE INVENTION

The present invention has been made to address at least the above problems and/or disadvantages and to provide at least the advantages described below. Accordingly, an aspect of the present invention provides a method for generating digital content, which includes perceiving a intermediary figure included in an inputted image, inserting a digital object to a location where the intermediary figure is displayed, and displaying digital content which is an image including the inserted digital object.

According to one aspect of the present invention, a method for generating digital content of a display apparatus is provided, which may include receiving an image, perceiving an intermediary figure included in the received image, inserting a digital object into a location where the intermediary figure is displayed, and displaying the digital content, which is the image with the inserted digital object.

The method may additionally include un-grouping the image and the inserted digital object of the digital content according to user selection.

The method may additionally include displaying the received image, and the inserting the digital object may include displaying a list of a plurality of digital objects to be inserted, if a user inputs a command directing to insert an object with respect to the intermediary figure included in the displayed image, and inserting a digital object, which is selected b the user from among the plurality of digital objects of the list of the digital objects, into a location where the intermediary figure is displayed.

According to various embodiments, a method for generating digital content is provided, in which an intermediary figure included in an inputted image is perceived, a digital object is inserted into a location where the intermediary figure is displayed, and digital content, which is the image into which the digital object is inserted, is displayed. Accordingly, the user can generate digital content easily using a touch screen.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
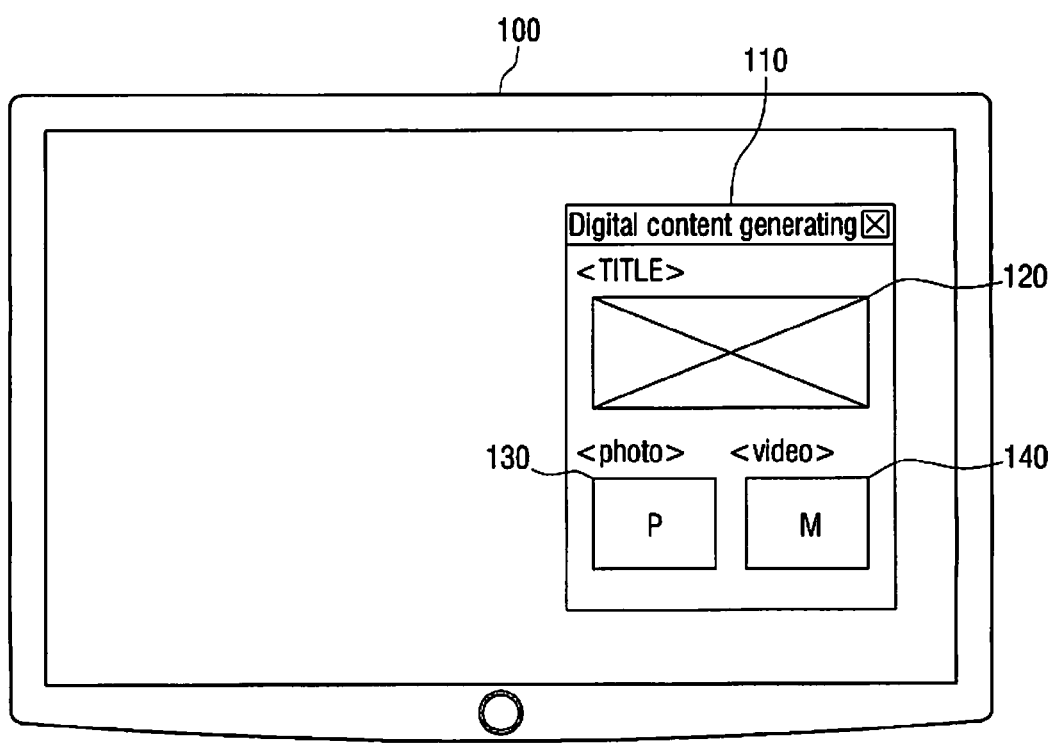
FIG. 1 is a diagram illustrating a screen of a display apparatus according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

FIG. 1 is a diagram illustrating a screen of a display apparatus 100 according to an embodiment. Referring to FIG. 1, a digital content generating window 110 on which an inputted image is presented, is displayed on the screen of the display apparatus 100.

The 'inputted image' herein is in a base template or form of the digital content. The inputted image includes a plurality of intermediary figures and thus is applied as the base forms to generate digital content. The intermediary figures will be explained in detail below.

The display apparatus 100 may receive an input in various manners. Specifically, the display apparatus 100 may receive from an external photographing apparatus an image taken by the external photographing apparatus. The external photographing apparatus herein may be implemented as one of digital camera, wired/wireless webcam, portable camera, camcorder, object image processor, or scanner. Accordingly, if the display apparatus 100 receives an image photographed by the external photographing apparatus, user may hand-draw a base image for digital content, photograph the hand-drawn image using the external photographing apparatus, and input the photographed image to the display apparatus 100. Then, the user may create an image incorporating a plurality of intermediary figures by hand-drawing the intermediary figures properly. As a result, the user can easily create an image as a basis for the digital content.

The display apparatus 100 may receive a base image for digital content based on an image stored at a built-in storage medium. Accordingly, the user may load frequently-used image and use the loaded image easily. The display apparatus 100 may also receive an image stored at an external device from the external device.

The display apparatus 100 may also receive an image drawn by user touch. By way of example, the display apparatus 100 may receive an image drawn on the touch screen by the user and use the received image as a base image for the digital content. Additionally, the display apparatus 100 may receive an image drawn on the touch screen of the external device from the external device and use the received image as a base image for the digital content.

The display apparatus 100 may also convert a document file, which is written by a document writing program of a computer such as PowerPoint or word processor, and apply the converted image file as the base image for the digital content.

As explained above, the display apparatus 100 may receive an inputted image in various manners. And as illustrated in FIG. 1, the inputted image is displayed on the digital content generating window 110.

The display apparatus 100 also perceives the intermediary figure included in the inputted image. Referring to FIG. 1, the image appearing on the digital content generating window 110 may include a first intermediary figure 120, a second intermediary figure 130, and a third intermediary figure 140. Accordingly, the display apparatus 100 perceives that the inputted image includes the first, second and third intermediary figures 120, 130, 140.

The intermediary figure corresponds to a location to which a digital object is to be inserted. The display apparatus 100 perceives the intermediary figures included in the inputted image, and inserts the digital object to the locations where the intermediary figures are displayed according to user selection. Specifically, the intermediary figures may include at least one of specific pattern, specific text, specific shape, and specific video.

Referring to FIG. 1, the first intermediary figure 120 may be a box pattern with a letter X formed therein, the second intermediary figure 130 may be a box with a letter P formed therein, and the third intermediary figure 140 may be a box with a letter M formed therein.

As explained above, there may be a plurality of intermediary figures, and the display apparatus 100 inserts different types of digital objects depending on the respective types of the intermediary figures. That is, the types of intermediary figures represent the types of to-be-inserted digital objects. By way of example, the first intermediary figure 120 corresponds to a location to which a text object related with a title is inserted. The second intermediary figure 130 corresponds to a location to which a photograph object is inserted. The third intermediary figure 140 corresponds to a location to which a video object is inserted. As explained above, which digital objects are inserted to the locations of the intermediary figures depends on the types of the intermediary figures.

The user may arbitrarily change the types of digital objects that correspond to the intermediary figures. Additionally, the user may set a new intermediary figure, and also designate a digital object that corresponds to the newly-set intermediary figure.

Herein, the 'digital object' refers to a certain type of sub-content which is inserted into an image inputted to generate digital content. The types of digital objects may include at least one of an image, video image, media file, text file, text input window, shapes, link information, widget, and application program. The types of digital objects inserted into the intermediary figures are determined according to the types of the intermediary figures.

Additionally, the display apparatus 100 may perceive the intermediary figures included in the inputted image by automatic or manual recognition. Specifically, if automatic recognition is set for the recognition of the intermediary figures, the display apparatus 100 perceives the intermediary figures included in the inputted image automatically upon input of the image. However, if the manual recognition is set for perceiving the intermediary figures, the display apparatus 100 perceives the intermediary figures included in the inputted image upon receipt of a user command directing to perceive the intermediary figures.

The display apparatus 100 inserts a digital object selected by the user into a location where the intermediary figure is displayed. Specifically, the display apparatus 100 displays a list of a plurality of digital objects to be inserted, upon receipt of a user command directing to insert the objects with respect to the intermediary figures included in the displayed image. That is, the display apparatus 100 displays on the screen a list of specific types of digital objects that correspond to the types of the intermediary figures, upon receipt of a command directing to insert an object with respect to a specific intermediary figure. By way of example, in response to a command directing to insert an object with respect to the second intermediary figure 130, the display apparatus 100 displays a list of image files which can be inserted. If a command directing to insert an object with respect to the third intermediary figure 140 is inputted, the display apparatus 100 displays a list of insertable video files.

The display apparatus 100 then inserts a digital object selected by the user from among the plurality of digital objects of the digital object list into a location where the intermediary figure is displayed.

If the user inserts a command directing to insert an object with respect to the intermediary figure included in the displayed image, the display apparatus 100 may display a Digital Object Type menu. The 'Digital Object Type menu' herein may include an image item, a video item, and a text item.

The display apparatus 100 displays a list of digital objects of the type as selected by the user from the Digital Object Type menu. By way of example, if the user selects an image item from the Digital Object Type menu, the display apparatus 100 displays a list of images which can be inserted into a location where a corresponding intermediary figure is displayed. If the user selects a video item from the Digital Object Type menu, the display apparatus 100 displays a list of video images which can be inserted into a location where a corresponding intermediary figure is displayed.

The display apparatus 100 may also drag & drop a digital object displayed on a background screen to insert the digital object into a location where the intermediary figure is displayed.

The display apparatus 100 inserts digital objects into a plurality of intermediary figures 120, 130, 140 displayed on the digital content generating window 110 and thus stores and displays the completed digital content. That is, the 'digital content' refers to the content which is completed as the digital objects are inserted into an inputted image.

The display apparatus 100 re-sizes the digital object to suit the size of the intermediary figure before inserting the digital object into the intermediary figure. Accordingly, the size of the intermediary figure corresponds to the size of the digital object after insertion. However, the display apparatus 100 may insert a digital object into an intermediary figure while maintaining a predetermined horizontal to vertical ratio of the digital object. Additionally, as the user selects, the display apparatus 100 may determine whether to insert the digital object in the size of the intermediary figure or in its original size.

As explained above, the display apparatus 100 may scale-down the digital object automatically or according to user selection, if the digital object to be inserted has a different size.

Additionally, the display apparatus 100 may generate digital content in a manner of grouping an inputted image and an inserted digital object together. That is, since the digital object and the image of the digital content form a group, the digital object changes size as the digital content changes size.

The display apparatus 100 may also un-group the digital content including the inputted image and the inserted digital object, according to user selection. If the digital content is un-grouped, the display apparatus 100 may change the location or size of the digital object of the digital content only, or remove the digital object from the digital content.

As explained above, the user is able to generate digital content easily, by simply inserting digital object through touch screen or the like based on hand-written image or previously-written image.

Accordingly, the display apparatus 100 inserts digital object into the intermediary figure according to the user selection, by automatically perceiving the intermediary figure included in the inputted image. As a result, the user can generate digital content by a simple operation, i.e., by inserting the digital object into a location where the intermediary figure is displayed.

Figure 2:
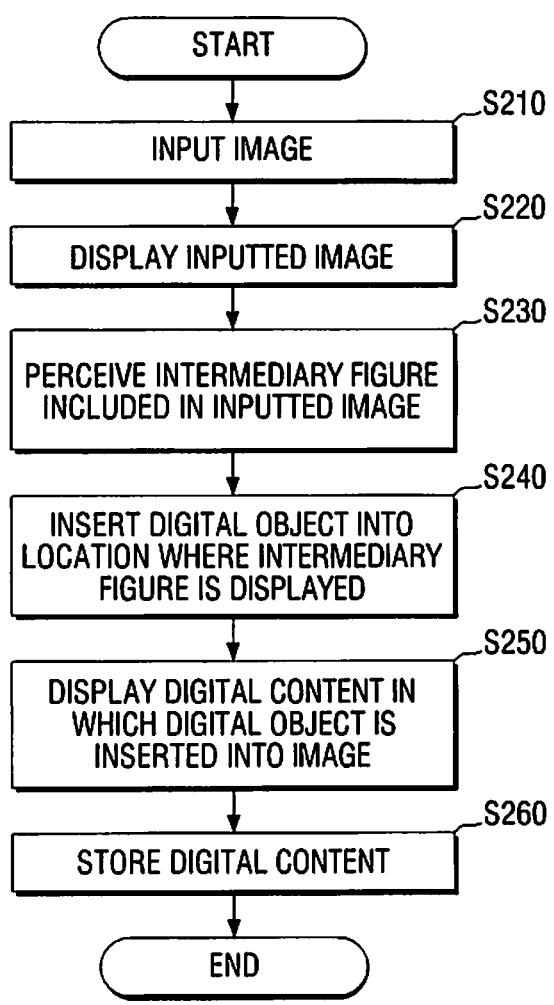
FIG. 2 is a flowchart provided to explain a method for generating digital content according to an embodiment of the present invention.

FIG. 2 is a flowchart provided to explain a method for generating digital content according to an embodiment.

First, at S210, the display apparatus 100 receives an image. The inputted image is applied as a template or form as a basis of the digital content. Since the inputted image includes a plurality of intermediary figures, the inputted image is applied as a base form of generating the digital content.

The display apparatus 100 may receive an input in various manners. Specifically, the display apparatus 100 may receive from an external photographing apparatus an image taken by the external photographing apparatus. The external photographing apparatus herein may be implemented as one of digital camera, wired/wireless webcam, portable camera, camcorder, object image processor, or scanner. An example where the image is received from a portable camera will be explained below with reference to FIGS. 3A to 3I, and an example where the image is inputted from an object image processor will be explained below with reference to FIGS. 4A to 4N.

Accordingly, if the display apparatus 100 receives an image photographed by the external photographing apparatus, user may hand-draw a base image for digital content, photograph the hand-drawn image using the external photographing apparatus, and input the photographed image to the display apparatus 100. Then, the user may create an image incorporating a plurality of intermediary figures by hand-drawing the intermediary figures properly. As a result, the user can easily create an image as a basis for the digital content.

The display apparatus 100 may receive a base image for digital content based on an image stored at a built-in storage medium. An example where the previously-stored image is inputted will be explained below with reference to FIGS. 5A to 5J. Accordingly, the user may load frequently-used image and use the loaded image easily. The display apparatus 100 may also receive an image stored at an external device from the external device.

The display apparatus 100 may also receive an image drawn by the user touch. By way of example, the display apparatus 100 may receive an image drawn on the touch screen by the user and use the received image as a base image for the digital content. Additionally, the display apparatus 100 may receive an image drawn on the touch screen of the external device from the external device and use the received image as a base image for the digital content. An example where an image is inputted based on the user touch selection will be explained in detail below with reference to FIGS. 6A to 6E and FIGS. 7A to 7E.

The display apparatus 100 may also convert a document file, which is written by a document writing program of a computer, and apply the converted image file as the base image for the digital content.

As explained above, the display apparatus 100 may receive an inputted image in various manners.

At S220, the display apparatus 100 displays the inputted image on the digital content generating window 110.

At S230, the display apparatus 100 perceives the intermediary figure included in the inputted image. The intermediary figure corresponds to a location to which a digital object is to be inserted. At S240, the display apparatus 100 inserts the digital object to the locations where the intermediary figures are displayed according to user selection. Specifically, the intermediary figures may include at least one of specific pattern, specific text, specific shape, and specific video.

There may be a plurality of intermediary figures, and the display apparatus 100 inserts different types of digital objects depending on the respective types of the intermediary figures. That is, the types of intermediary figures represent the types of to-be-inserted digital objects.

Herein, the 'digital object' refers to a certain type of sub-content which is inserted into an image inputted to generate digital content. The types of digital objects may include at least one of an image, video image, media file, text file, text input window, shapes, link information, widget, and application program. The types of digital objects inserted into the intermediary figures are determined according to the types of the intermediary figures.

The display apparatus 100 inserts a digital object selected by the user into a location where the intermediary figure is displayed. Specifically, the display apparatus 100 displays a list of a plurality of digital objects to be inserted, upon receipt of a user command directing to insert the objects with respect to the intermediary figures included in the displayed image.

That is, the display apparatus 100 displays on the screen a list of specific types of digital objects that correspond to the types of the intermediary figures, upon receipt of a command directing to insert an object with respect to a specific intermediary figure. By way of example, in response to a command directing to insert an object with respect to the second intermediary figure 130, the display apparatus 100 displays a list of image files which can be inserted. If a command directing to insert an object with respect to the third intermediary figure 140 is inputted, the display apparatus 100 displays a list of insertable video files.

The display apparatus 100 then inserts a digital object selected by the user from among the plurality of digital objects of the digital object list into a location where the intermediary figure is displayed.

If the user inserts a command directing to insert an object with respect to the intermediary figure included in the displayed image, the display apparatus 100 may display a menu of digital object types. The 'menu of digital object types' herein may include an image item, a video item, and a text item.

The display apparatus 100 displays a list of digital objects of the type as selected by the user from the menu of digital object types.

At S250, the display apparatus 100 displays the digital content in which the digital object is inserted into the image. At S260, the display apparatus 100 stores the completed digital content as a separate file. The display apparatus 100 may also store the entire screen on which the completed digital content is displayed.

Additionally, the display apparatus 100 may generate digital content in a manner of grouping an inputted image and an inserted digital object together. That is, since the digital object and the image of the digital content form a group, the digital object changes size as the digital content changes size.

The display apparatus 100 may also un-group the digital content including the inputted image and the inserted digital object, according to a user selection. If the digital content is un-grouped, the display apparatus 100 may change the location or size of the digital object of the digital content only, or remove the digital object from the digital content.

As explained above, the user is able to generate digital content easily, by simply inserting digital object through touch screen or the like based on hand-written image or previously-written image.

Accordingly, the display apparatus 100 inserts digital object into the intermediary figure according to user selection, by automatically perceiving the intermediary figure included in the inputted image. As a result, the user can generate digital content by a simple operation, i.e., by inserting the digital object into a location where the intermediary figure is displayed.

FIGS. 3A to 3I illustrate the process of receiving an image photographed by a camera and generating content using the inputted image, according to an embodiment.

Figure 3A:
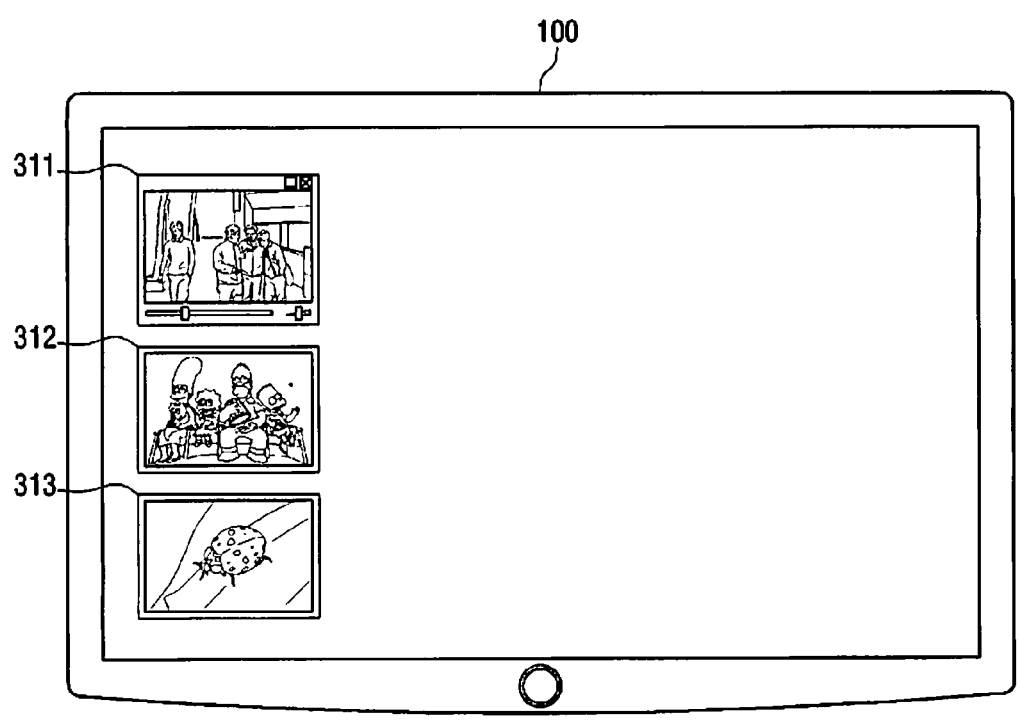
FIGS. 3A to 3I illustrate the process of receiving an image photographed by a camera and generating content using the inputted image, according to an embodiment of the present invention.

FIG. 3A illustrates the screen of the display apparatus 100. Referring to FIG. 3A, a first video object 311, a first photo object 312 and a second photo object 313 are currently displayed on the screen of the display apparatus 100.

Figure 3B:
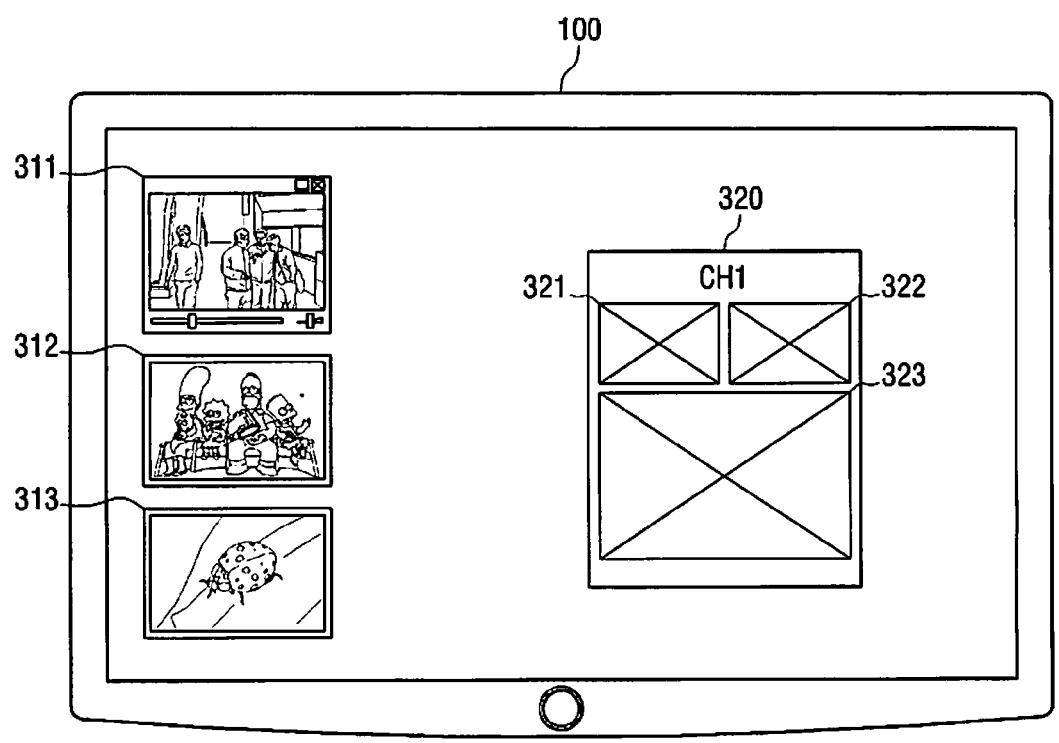

At this state, if a paper sheet 320 as a basis for content is placed on the right side of the screen as illustrated in FIG. 3B, the display apparatus 100 perceives the location where the paper sheet 320 is placed and also the size of the paper sheet 320. The paper sheet 320 includes a first intermediary figure 321, a second intermediary figure 322 and a third intermediary figure 323.

Figure 3C:
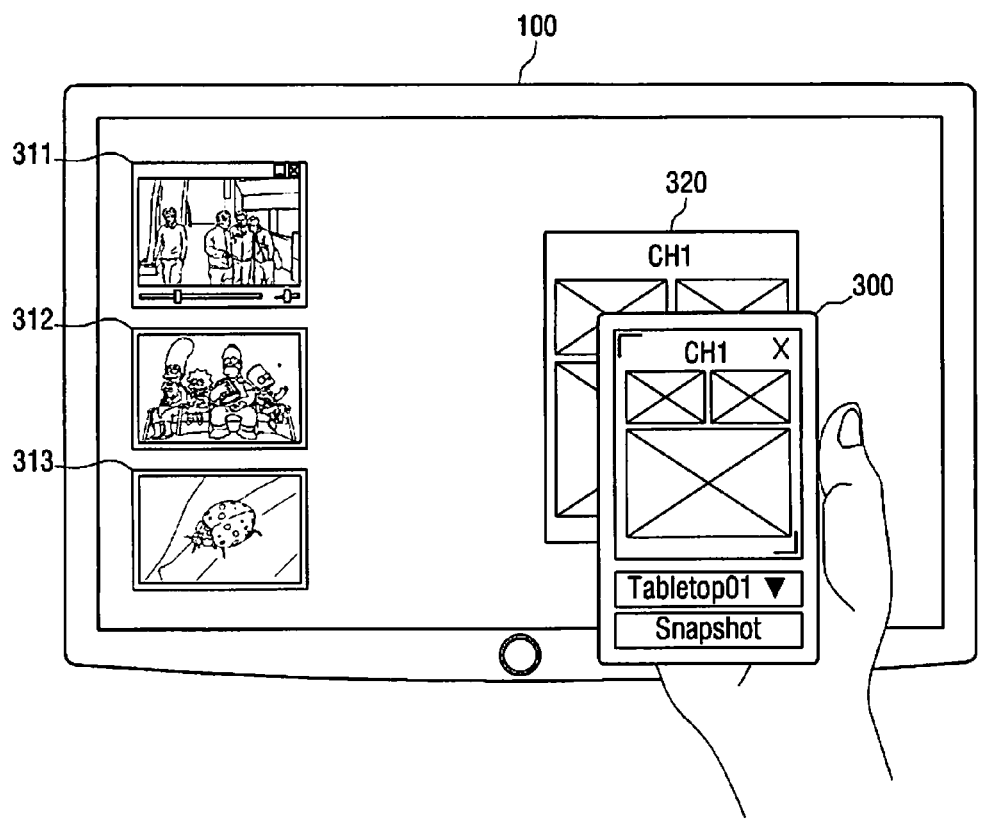
Figure 3D:
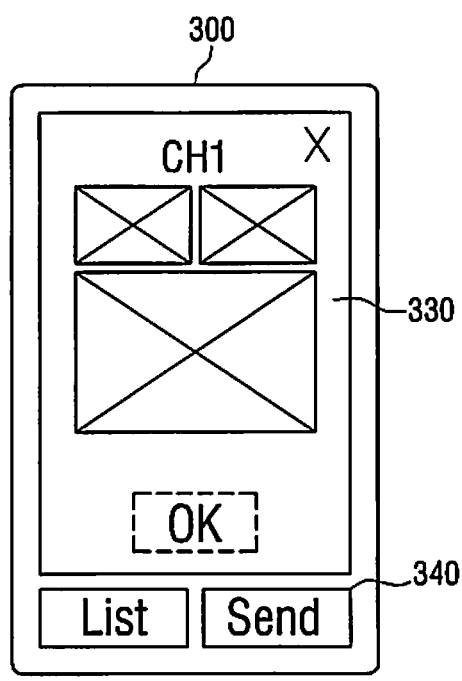

Referring to FIG. 3C, the user photographs the paper sheet 320 using the camera 300. Referring to FIG. 3D, the camera displays the image 330 corresponding to the paper sheet 320 on the screen. If the user presses 'send' button 340, the camera 300 transfers the photographed image 330 of the paper sheet 320 to the display apparatus 100.

Figure 3E:
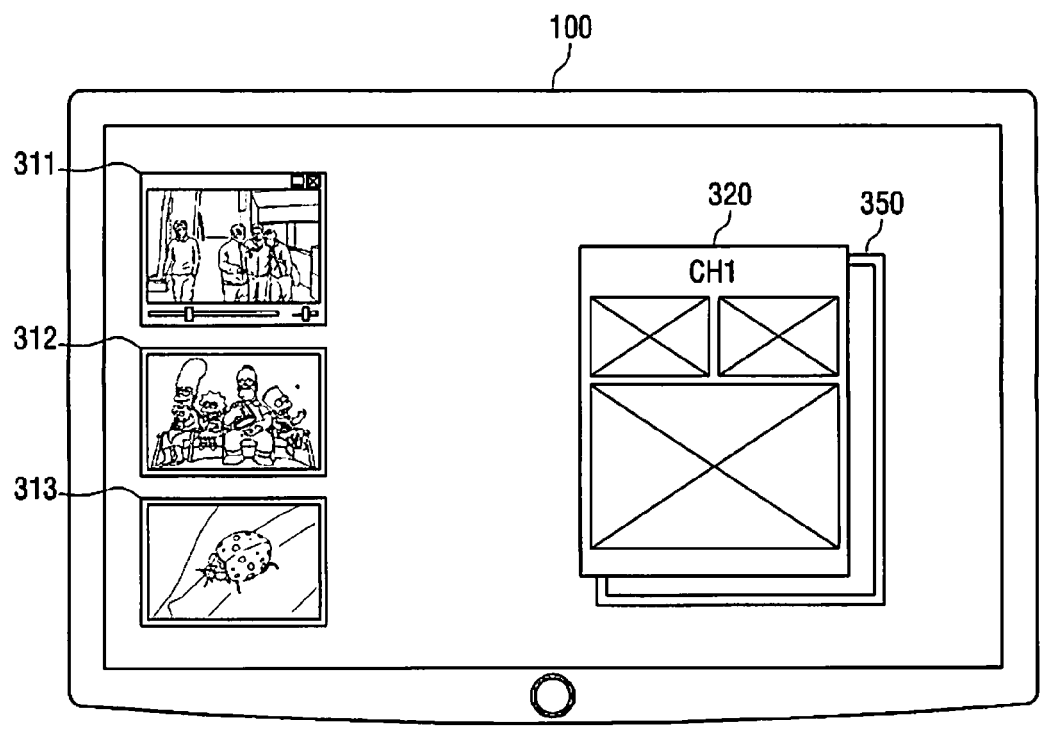

Referring to FIG. 3E, the display apparatus 100 displays the photographed image 330 on the digital content generating window 350. As illustrated, the display apparatus 100 displays the digital content generating window 350 in the same size as that of the paper sheet 320 and on the same location as the paper sheet 320.

Figure 3F:
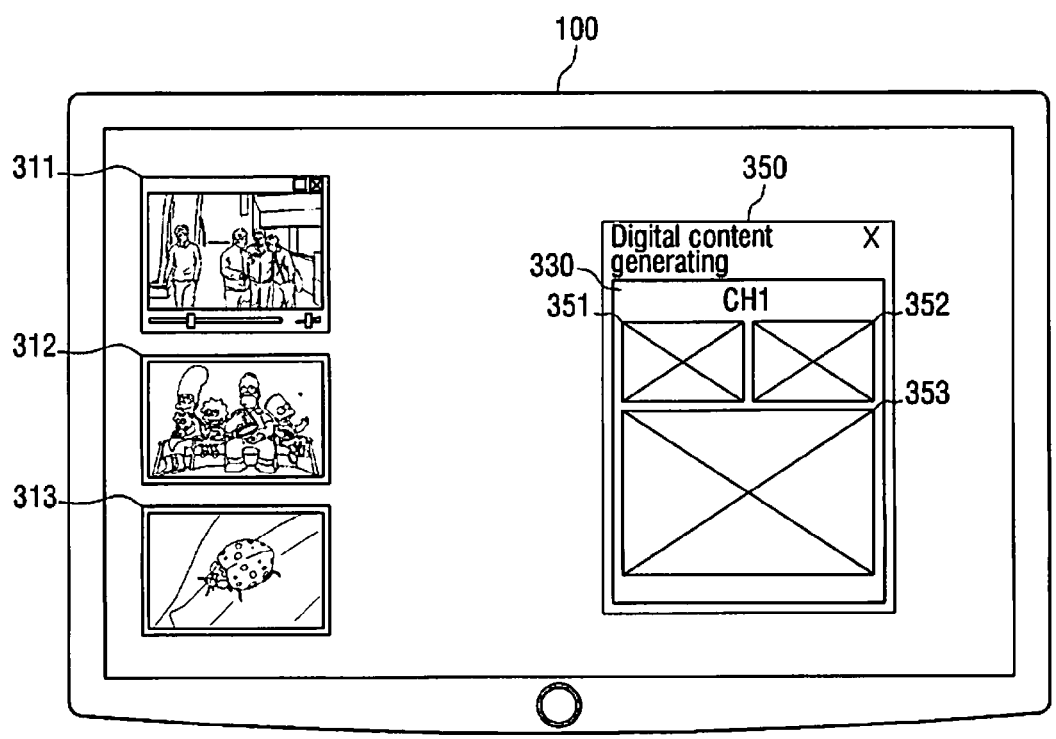

Referring to FIG. 3F, the user can see the digital content generating window 350 displayed on the screen of the display apparatus 100 as he removes the paper sheet 320. The digital content generating window 350 displays the photographed image 330. And the photographed image 330 includes the first, second and third intermediary figures 351, 352, 353 which are exactly the same as drawn on the paper sheet 320. Accordingly, when the photographed image 330 is inputted, the display apparatus 100 perceives that the photographed image 330 contains the first, second and third intermediary figures 351, 352, 353.

Figure 3G:
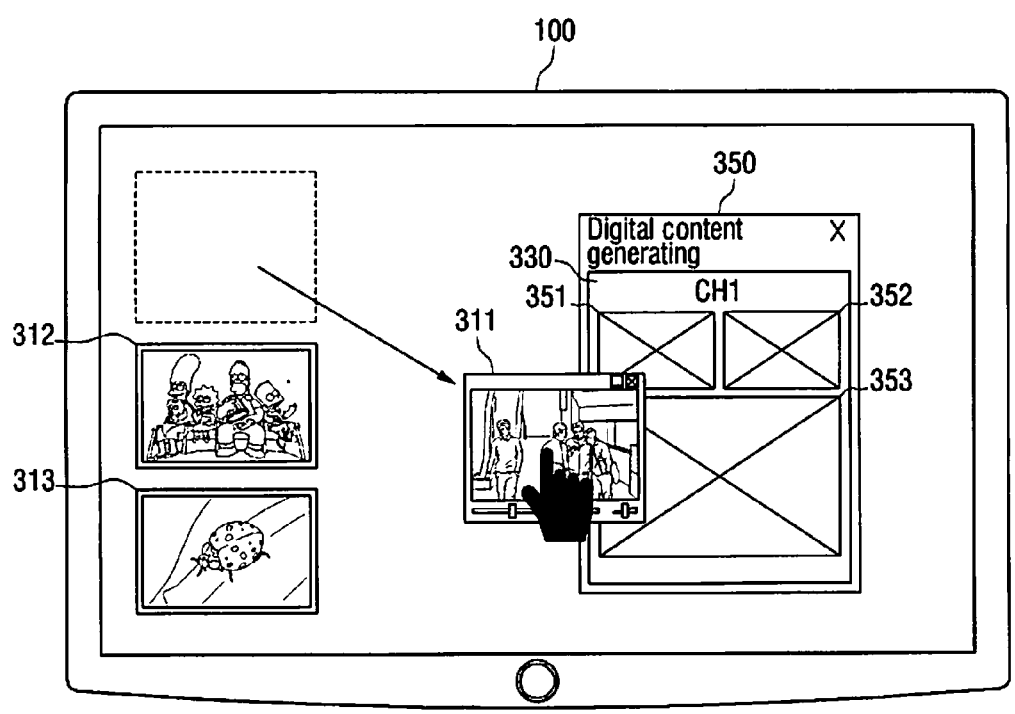

Referring to FIG. 3G, by dragging & dropping the video object 311 from among the digital objects 311, 312, 313 displayed on the background screen into the third intermediary figure 353, the user can insert the video object 311 into a location where the third intermediary figure 353 is displayed.

Figure 3H:
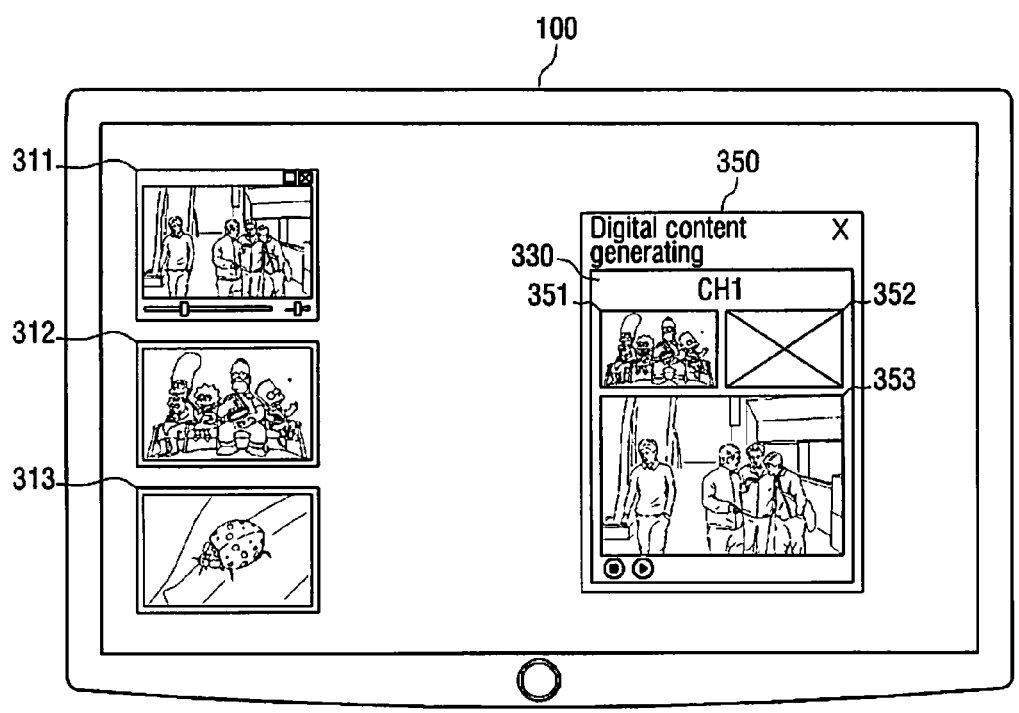

FIG. 3H illustrates a situation in which the first photo object 312 is inserted into the first intermediary figure 351, and the video object 311 is inserted into the third intermediary figure 353, with respect to the image 330 displayed on the digital content generating window 350.

Figure 3I:
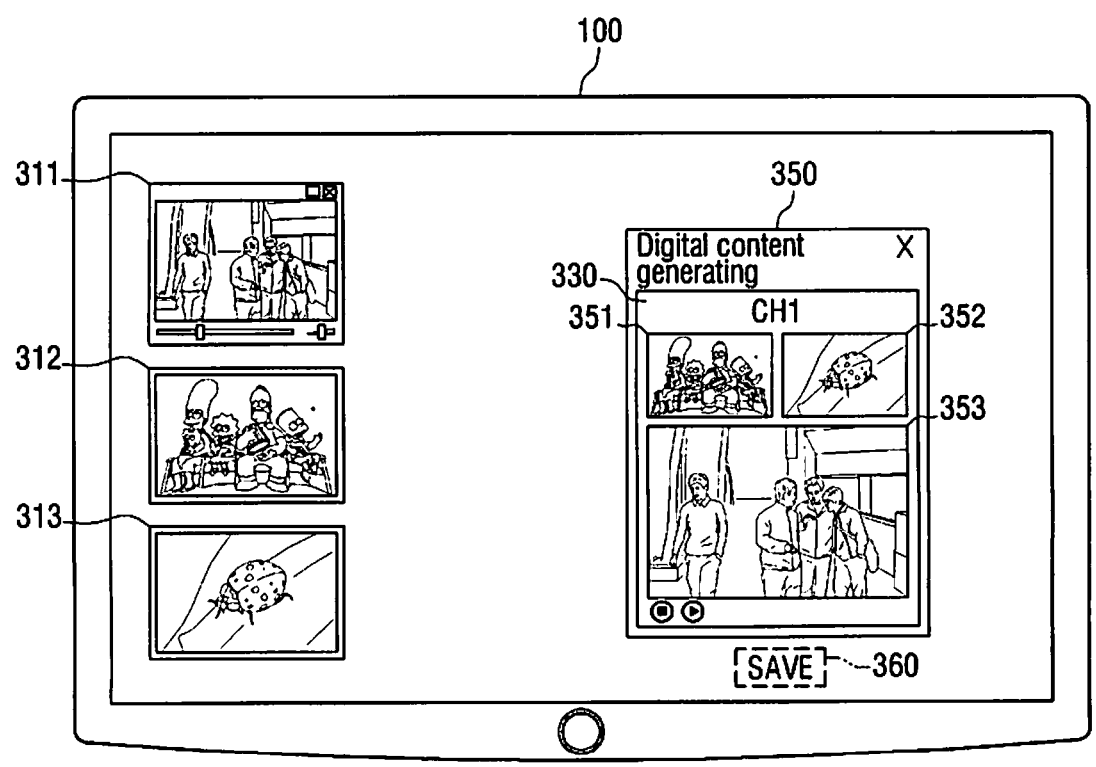

FIG. 3I illustrates a situation in which the first photo object 312 is inserted into the first intermediary figure 351, the second photo object 313 is inserted into the second intermediary figure 352, and the video object 311 is inserted into the third intermediary figure 353. Accordingly, if a save button 360 is touched in a state that the digital content is completed, the display apparatus 100 stores the completed digital content as displayed on the digital content generating window 100 as a separate file.

By the process explained above, the display apparatus 100 receives an image photographed by the camera and generates content using the inputted image. Accordingly, the user photographs a hand-drawn picture on a paper sheet with the camera and generates digital content on the display apparatus 100 based on the photographed picture.

Figure 4A:
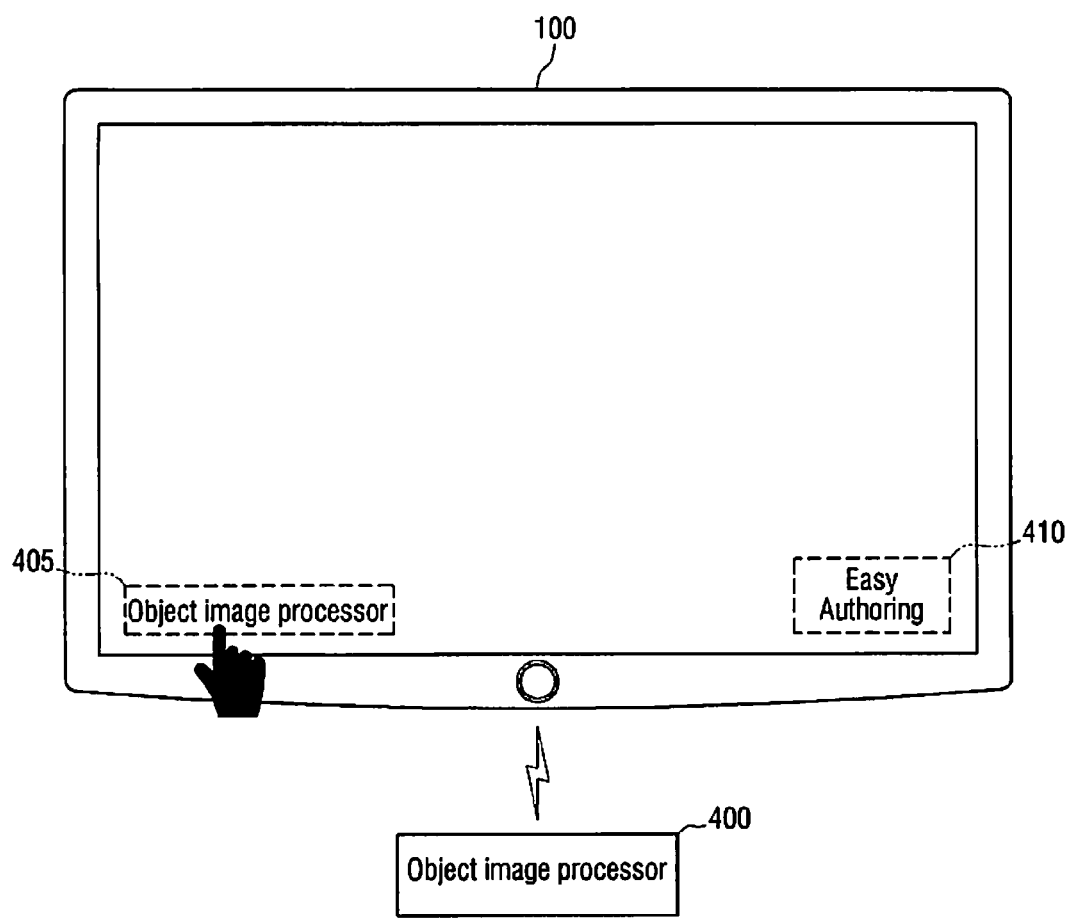
FIGS. 4A to 4N illustrate the process in which an image photographed by the object image processor is inputted and content is generated using the inputted image.
Figure 4B:
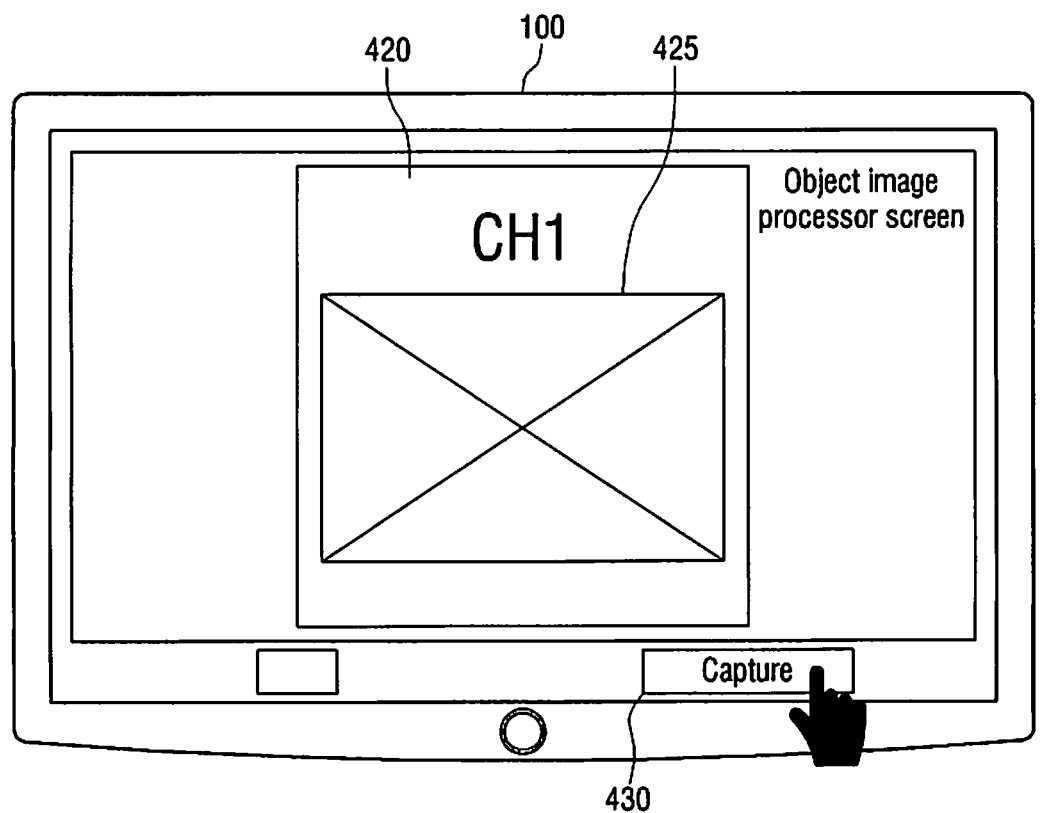
Figure 4C:
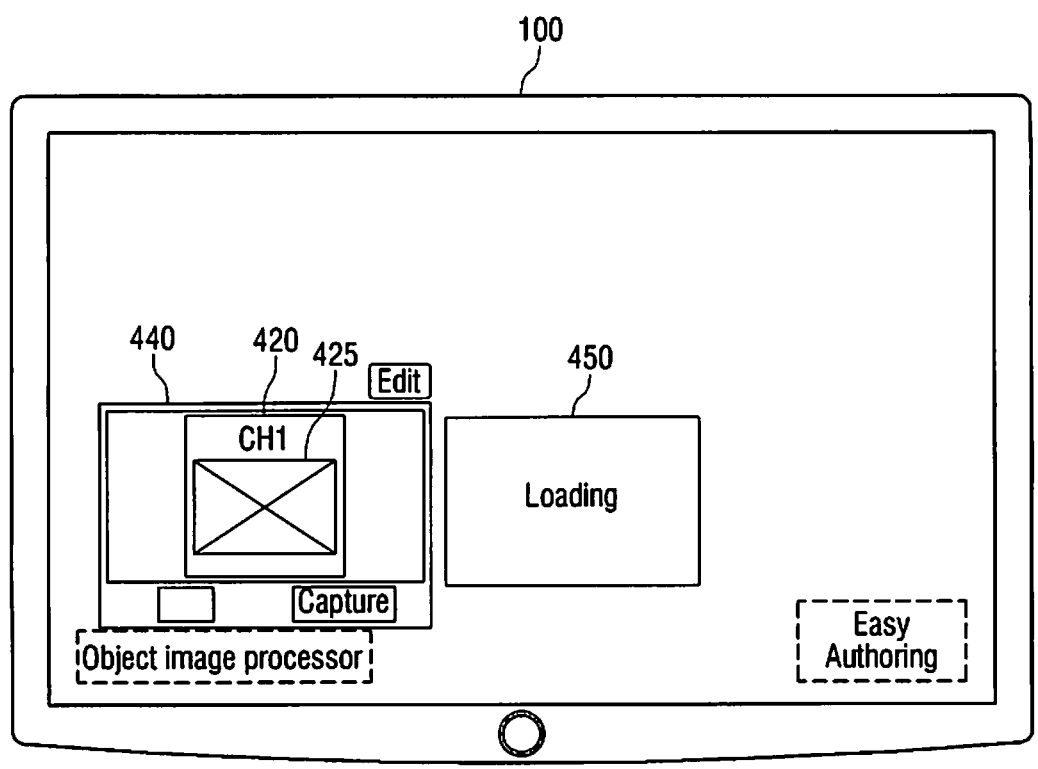
Figure 4D:
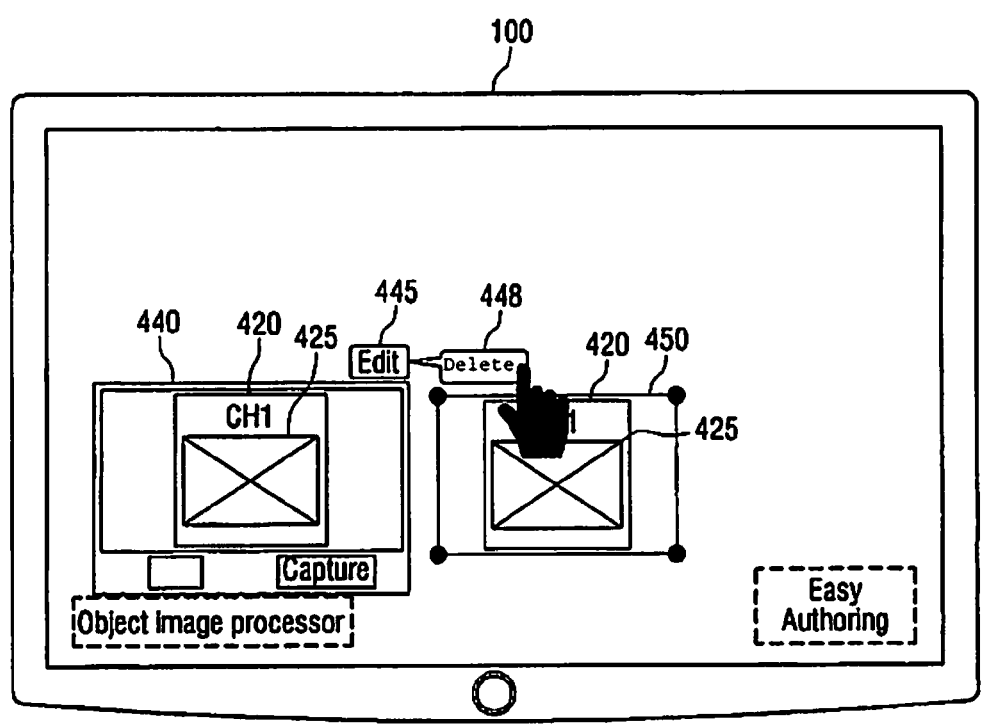
Figure 4E:
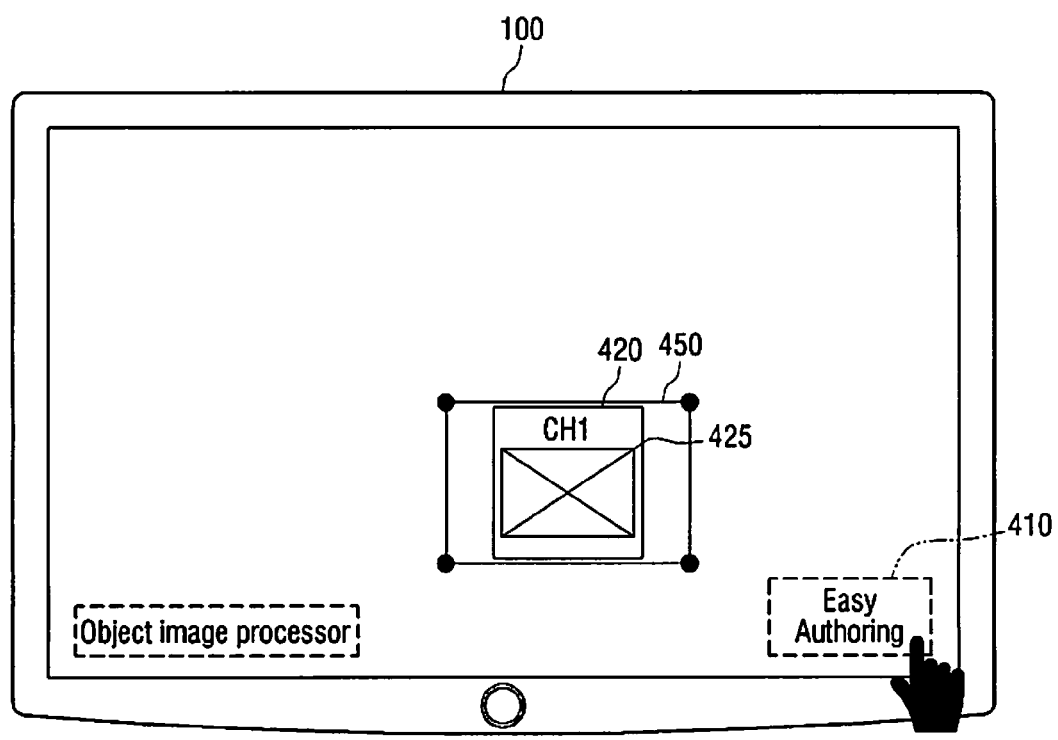
Figure 4F:
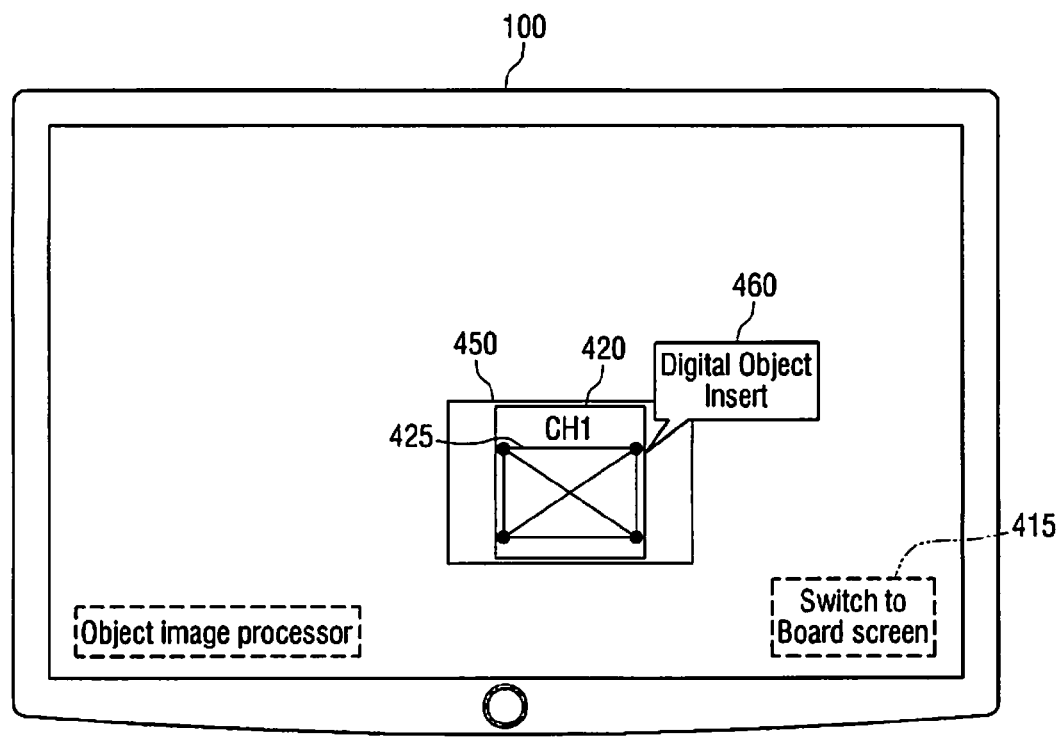
Figure 4G:
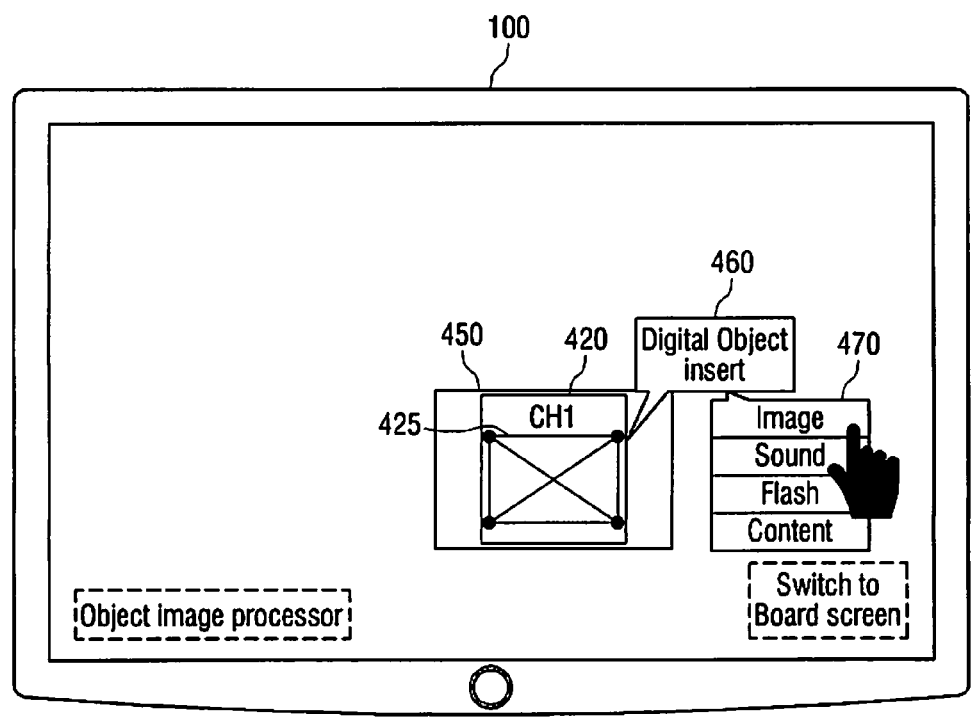
Figure 4H:
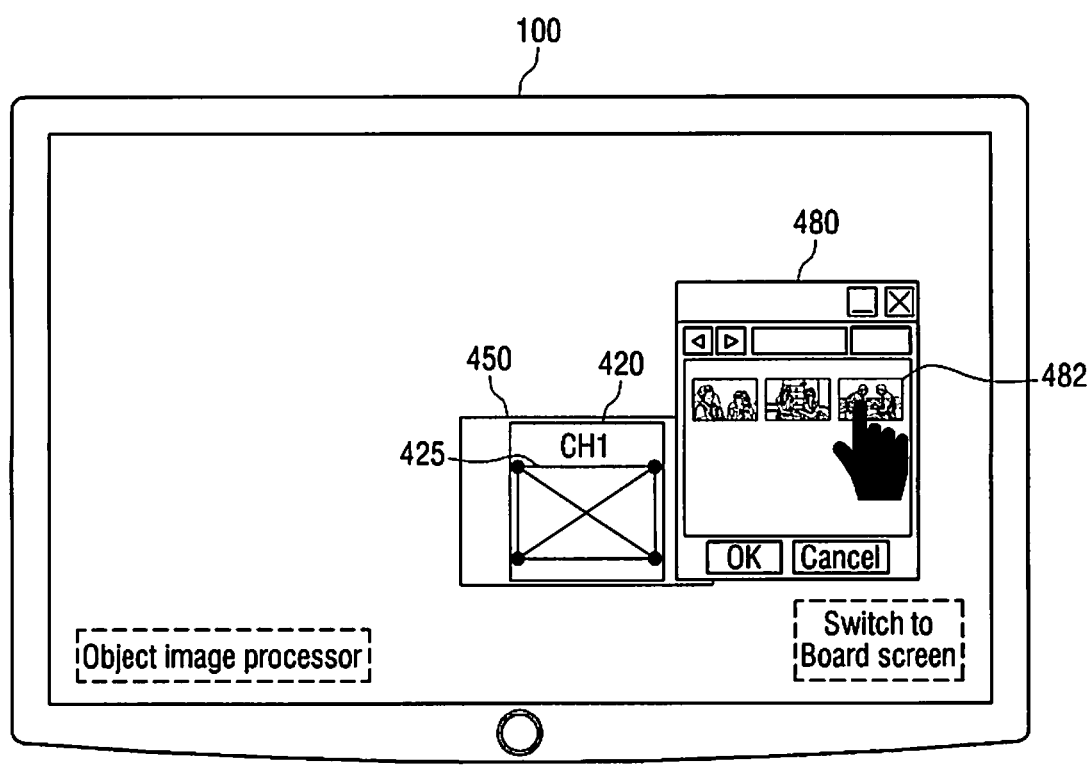
Figure 4I:
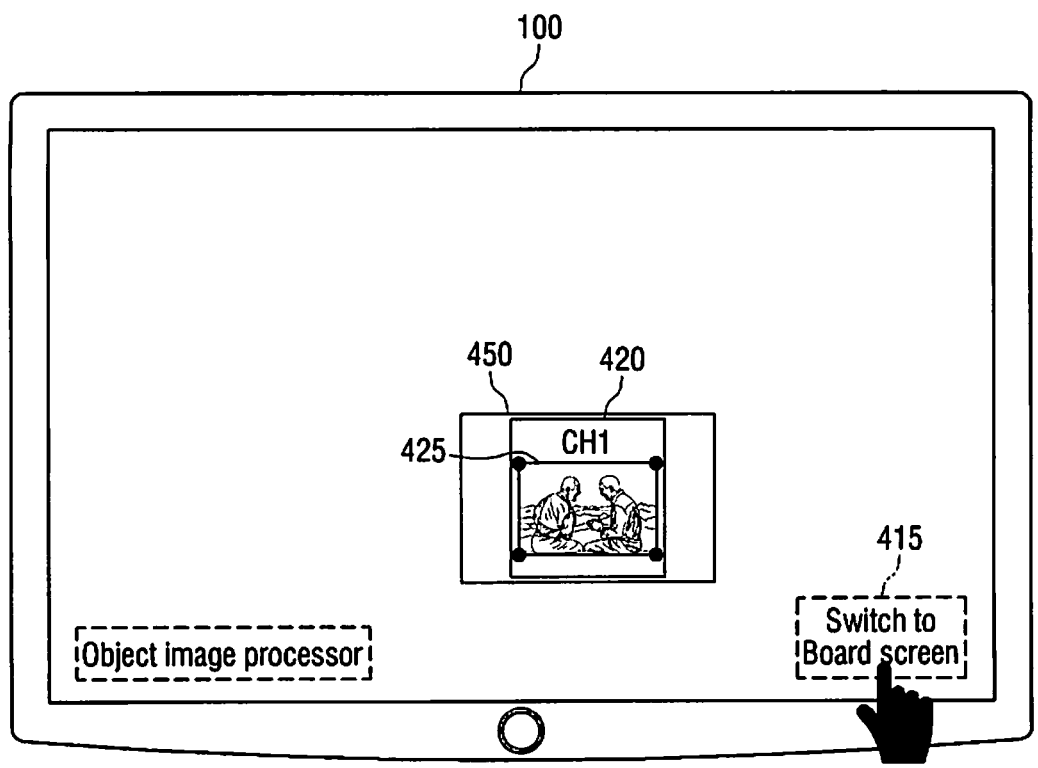
Figure 4J:
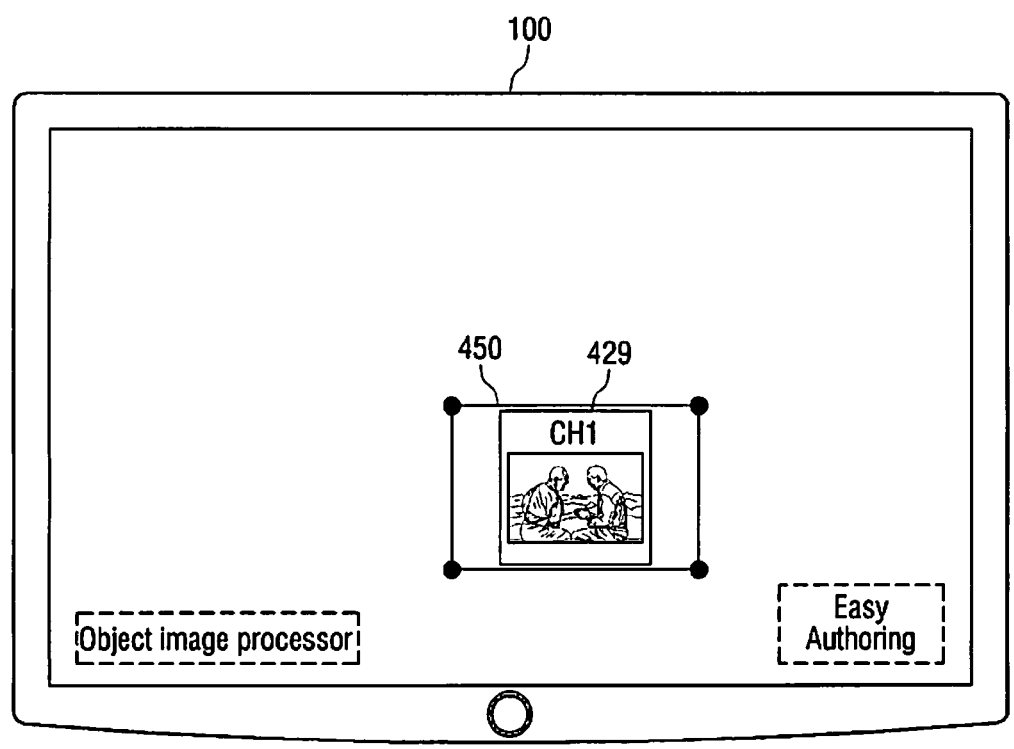
Figure 4K:
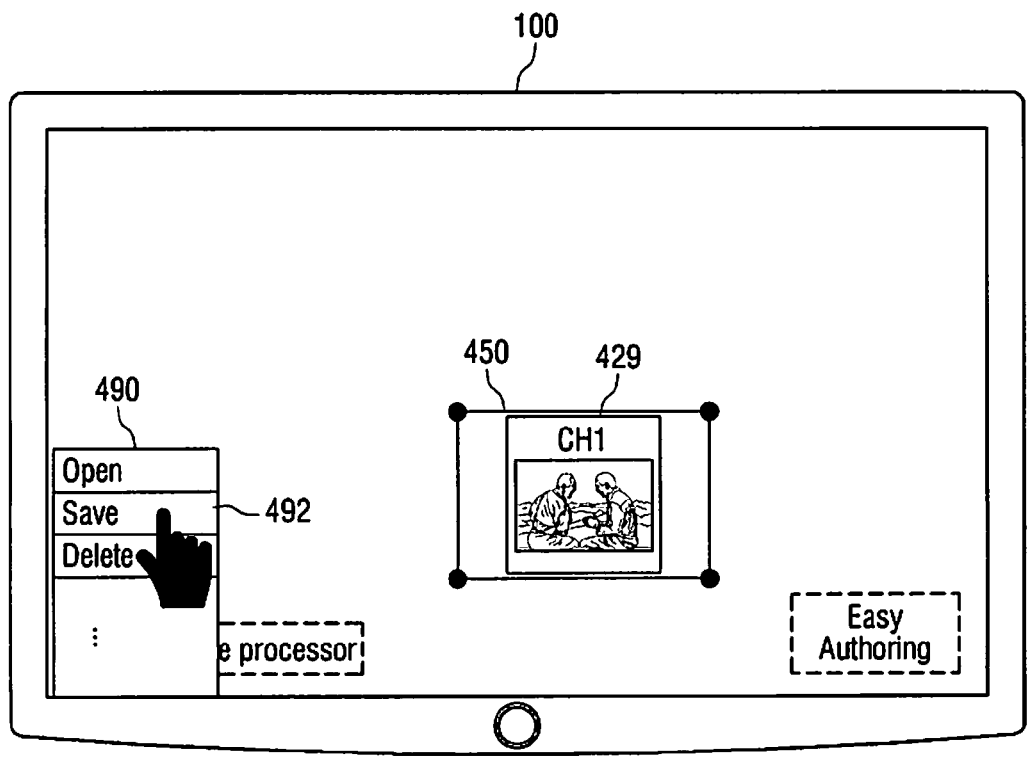
Figure 4L:
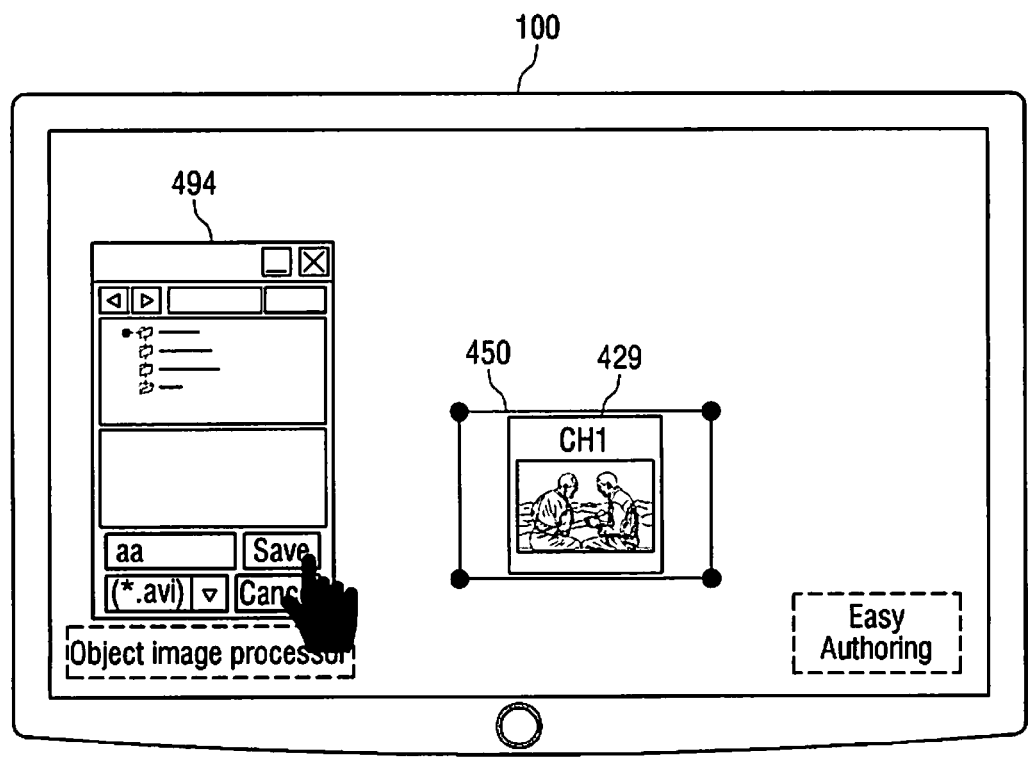
Figure 4M:
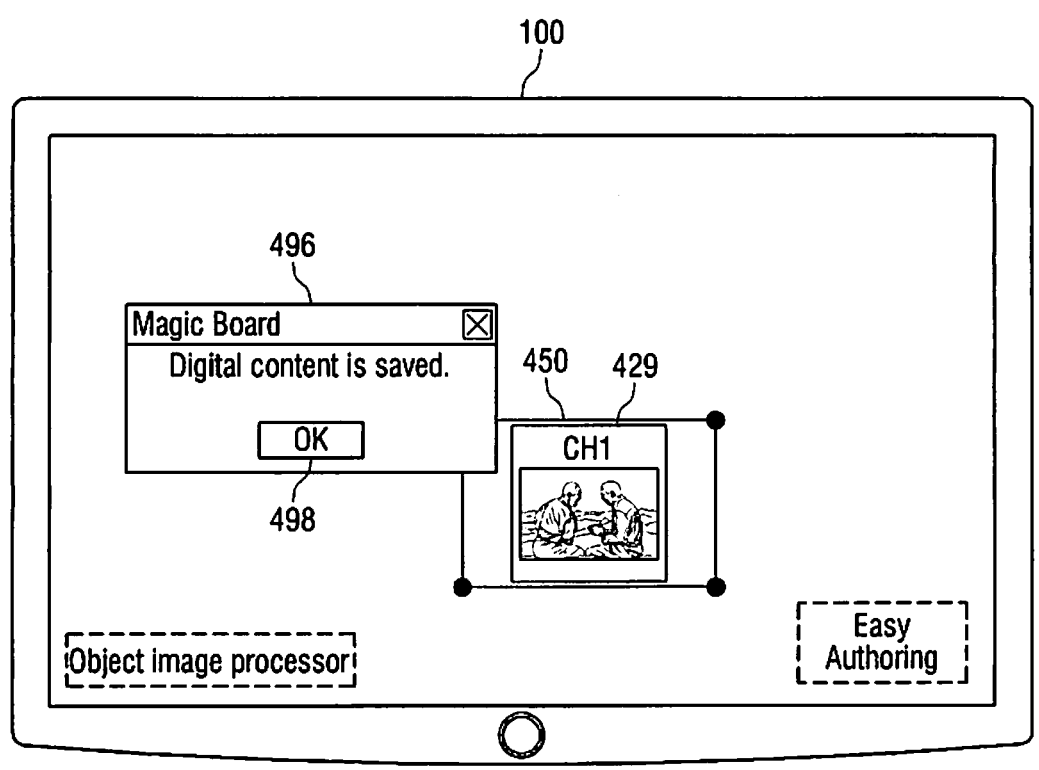
Figure 4N:
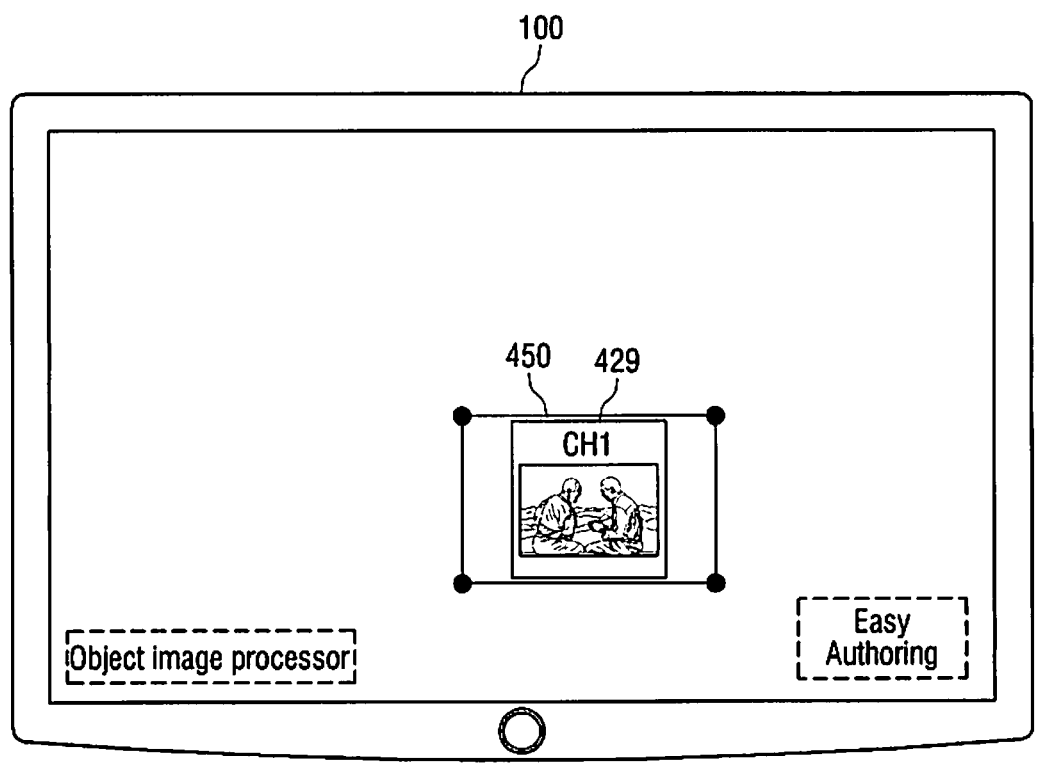

Referring to FIGS. 4A to 4N, the process of receiving an image photographed by an object image processor and generating content using the inputted image will be explained below. FIGS. 4A to 4N illustrate the process in which an image photographed by the object image processor is inputted and content is generated using the inputted image. The object image processor herein refers to a device which photographs images of various objects and transfers the photographed images to the surrounding devices. The object image processor provides various additional functions and is widely used in many applications such as teaching equipment at a classroom. The object image processor is used mainly to display the content of books, printouts on a connected display apparatus 100 in an increased size. Since a lens is formed on an upper end of the object image processor, the object image processor transfers the image of any object that is placed under the lens to the display apparatus 100 at room brightness.

FIG. 4A illustrates the screen of the display apparatus 100 which is capable of communicating with the object image processor 400. Referring to FIG. 4A, an 'Easy Authoring' button 410 is currently displayed on the screen of the display apparatus 100. A button 405 of the object image processor 400 is provided to receive a command directing to display the image photographed by the object image processor 400 on the screen of the display apparatus 100. Accordingly, if the user selects the 'Easy Authoring' button 410, the display apparatus 100 perceives an intermediary figure from the inputted image.

FIG. 4B illustrates a situation in which an image 420, currently photographed by the object image processor 400, is displayed as the entire screen. Referring to FIG. 4B, the image 420 photographed by the object image processor 400 includes an intermediary figure 425. If the user selects a 'capture' button 430, the display apparatus 100 captures the image being photographed by the object image processor 400 as a separate image as illustrated in FIGS. 4C and 4D.

FIG. 4C illustrates a situation in which an Object Image Processor window 440 is displayed in response to selection of a capture button 430 of FIG. 4B, so that the image captured at a capture image display area 450 is loaded. The Object Image Processor window 440 displays in real-time basis an image photographed by the object image processor 400. That is, the Object Image Processor window 440 of FIG. 4C is the entire screen of FIG. 4B displayed as a window form.

When loading is completed, referring to FIG. 4D, the display apparatus 100 captures the image 420 displayed on the Object Image Processor window 440 as is, and displays the captured image on the capture image display area 450. The display apparatus 100 stores the captured image 420 as a separate file.

Additionally, if the user touches a delete button 448 which is an additional button with respect to the Edit button 445, the display apparatus 100 removes the Object Image Processor window 440 from the screen.

FIG. 4E illustrates the screen from which the Object Image Processor window 440 is removed. Referring to FIG. 4E, the captured image 420 is displayed on the capture image display area 450. As illustrated, the captured image includes the intermediary figure 425.

At this state, if the user selects the Easy Authoring button 410, the display apparatus 100 perceives an existence of the intermediary figure 425 in the captured image 420.

Referring to FIG. 4F, the Easy Authoring button 410 of FIG. 4E is automatically converted to 'Switch to Board Screen' button 415 of 4F. The 'Switch to Board Screen' button 415 receives a command directing to release Easy Authoring function. That is, the display apparatus 100 toggles between 'executing' and 'releasing' of the Easy Authoring function according to the Easy Authoring button 410 and the 'Switch to Board Screen' button 415. Although the button to receive a command directing to release the Easy Authoring function is named as 'Switch to Board Screen' button 415 in the example explained above, the button 415 may be named otherwise. For example, the button to receive a command directing to release the Easy Authoring function may be named as 'Easy Authoring Release' button. Alternatively, the name of the Easy Authoring button may be retained, but the form of the button can change. In this case, the user understands that the Easy Authoring button operates in a toggling manner, based on the effect that the form of the Easy Authoring button changes.

FIG. 4F illustrates the screen on which a Digital Object Insert icon 460 is displayed on the intermediary figure 425 according to a perception at the display apparatus 100 of the existence of the intermediary figure 425 in the captured image 420. The Digital Object Insert icon 460 receives a command directing to insert a digital object into the intermediary figure 425. Accordingly, if the user selects the Digital Object Insert icon 460, the display apparatus 100 carries out the process of inserting a digital object into the intermediary figure 425. The Digital Object Insert icon 460 may exist on the image of the intermediary figure 425, in the same shape and size as those of the intermediary shape 425. The display apparatus 100 may also carry out a process of inserting a digital object in a state that the Digital Object Insert icon 460 is not displayed, by responding to selecting of the intermediary figure 425 itself.

FIG. 4G illustrates the screen on which Digital Object Type menu 470 is displayed. If the user selects the Digital Object Insert icon 460, the display apparatus 100 displays the Digital Object Type menu 470. Referring to FIG. 4G, the Digital Object Type menu 470 may include an image item, a sound item, a flash item, and a content item.

If the image item is selected from the Digital Object Type menu 470, referring to FIG. 4H, the display apparatus 100 displays an Image Object Select window 480. If a specific image 482 is selected from the Image Object Select window 480, the display apparatus 100 inserts the selected specific image 480 into a location where the intermediary figure 425 is displayed.

FIG. 4I illustrates the screen on which the selected specific image 482 is inserted into the location where the intermediary figure 425 is displayed. As explained above, if the user selects the 'Switch to Board Screen' button 415 after the selected specific image 482 is inserted into the location where the intermediary figure 425 is displayed, the display apparatus 100 finishes generating of the digital content.

FIG. 4J illustrates a situation in which the completed digital content 429 is displayed on the capture image display area 450. Referring to FIG. 4K, if a save item 492 is selected from the menu 490, the display apparatus 100 stores the completed digital content 429.

That is, referring to FIG. 4L, if the user inputs a save command with respect to the storing location selected through a storing location select window 494, the display apparatus 100 stores the completed digital content 429 at the selected storing location.

Then, referring to FIG. 4M, the display apparatus 100 displays a message window 496 to inform that the digital content is stored. Then, referring to FIG. 4N, if the user selects an OK button 498, the display apparatus 100 removes the message window 496 from the screen.

By the processes explained above, the display apparatus 100 receives an image photographed by the object image processor 400 and generates digital content using the received image. Accordingly, the user can photograph a hand-drawn picture on a paper sheet using the object image processor 400 and generate digital content on the display apparatus 100 based on the photographed image.

The process of generating digital content by receiving a previously-stored image and using the received image will be explained below with reference to FIGS. 5A to 5J. FIGS. 5A to 5J illustrate the process of generating digital content by receiving a previously-stored image and using the received image, according to an embodiment. The previously-stored image may include an image stored at the display apparatus 100, or an image stored at an external device. To use an image stored at an external device, the display apparatus 100 is communicably connected to the external device and receives the image from the external device.

Figure 5A:
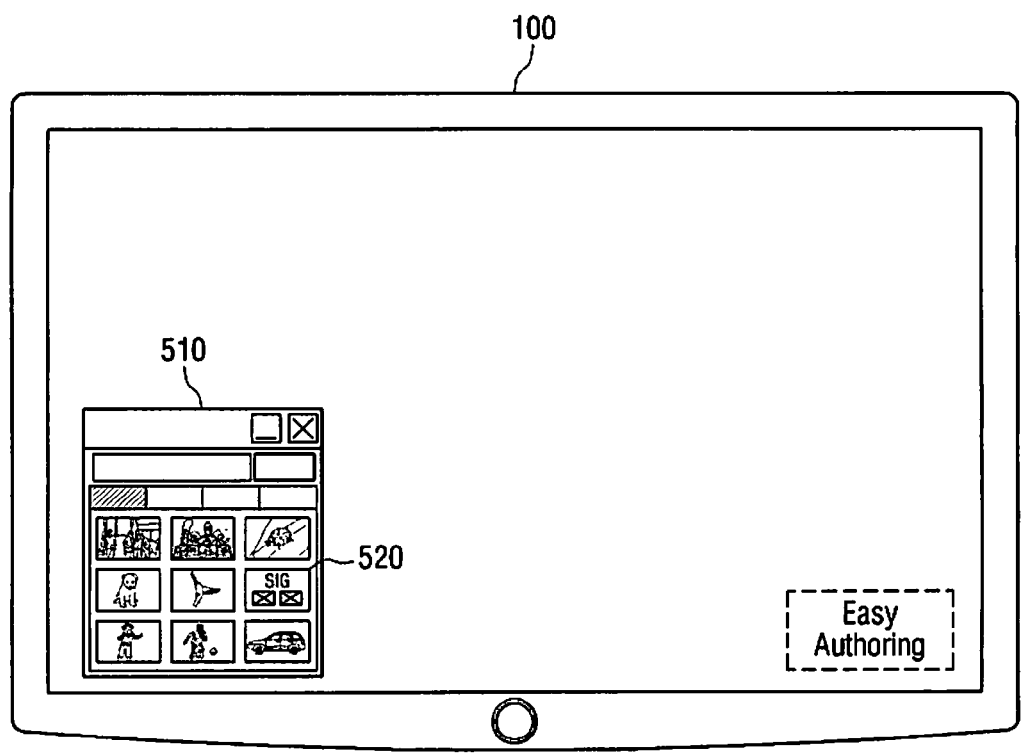
FIGS. 5A to 5J illustrate the process of generating digital content by receiving a previously-stored image and using the received image, according to an embodiment of the present invention.

FIG. 5A illustrates the screen on which a stored image file list 510 is displayed. Referring to FIG. 5A, the stored image file list 510 includes a specific image 520 which is the base of the digital content to be generated.

Figure 5B:
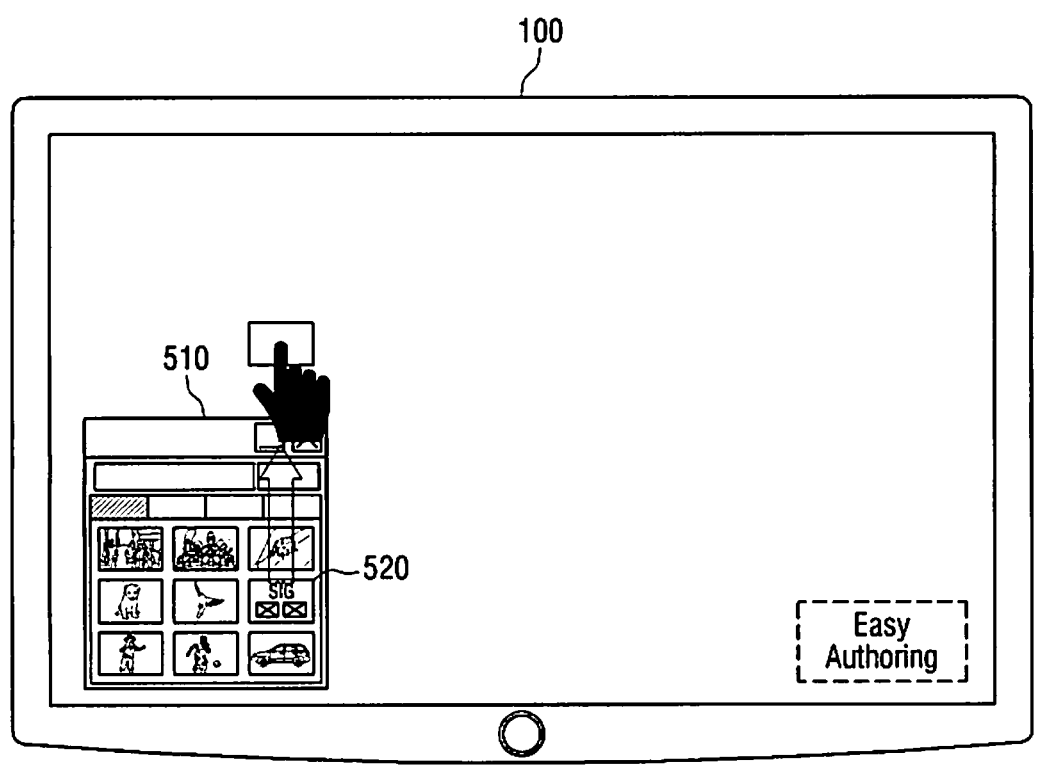

FIG. 5B illustrates dragging & dropping by the user of the specific image 520 to the background screen. Referring to FIG. 5B, if the user drags & drops the specific image 520 to the background screen, as illustrated in FIG. 5C, the specific image 520 is displayed in its original size at the dragged & dropped location.

Figure 5C:
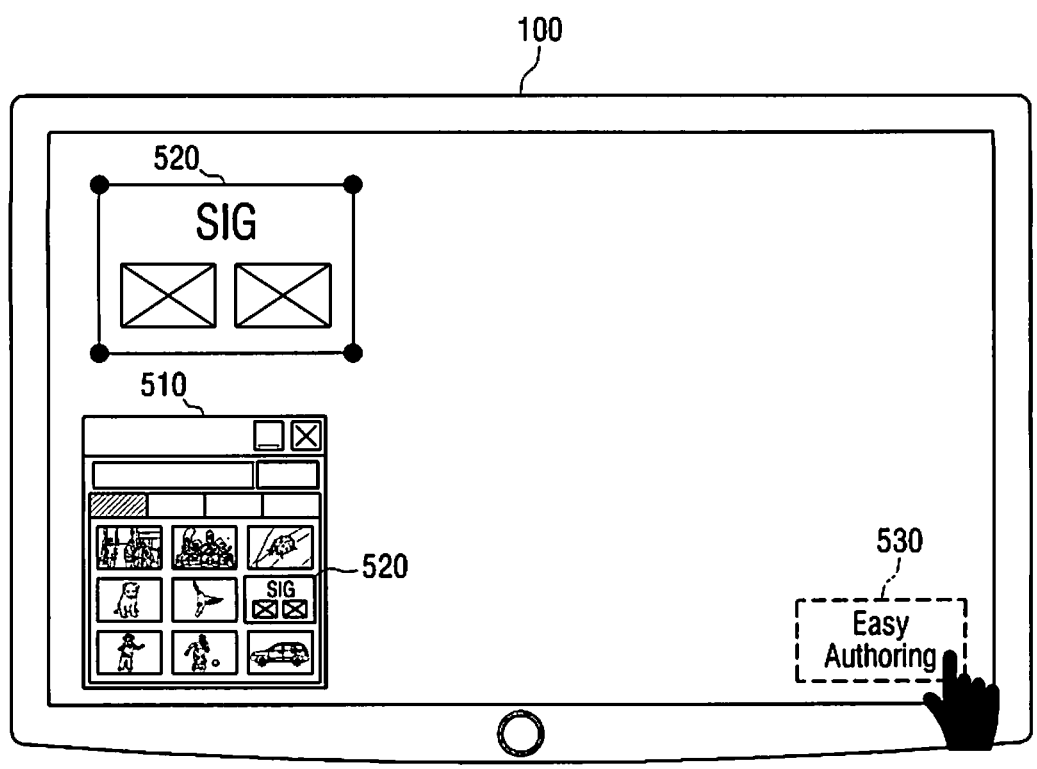

In such a state, if the user selects an Easy Authoring button 530 as illustrated in FIG. 5C, the display apparatus 100 perceives the intermediary figure in the specific image 520. The Easy Authoring button 530 is provided to receive a command directing to perceive the intermediary figure.

Accordingly, in response to user selection of the Easy Authoring button 510, the display apparatus 100 perceives the existence of a first intermediary figure 523 and a second intermediary figure 526.

Figure 5D:
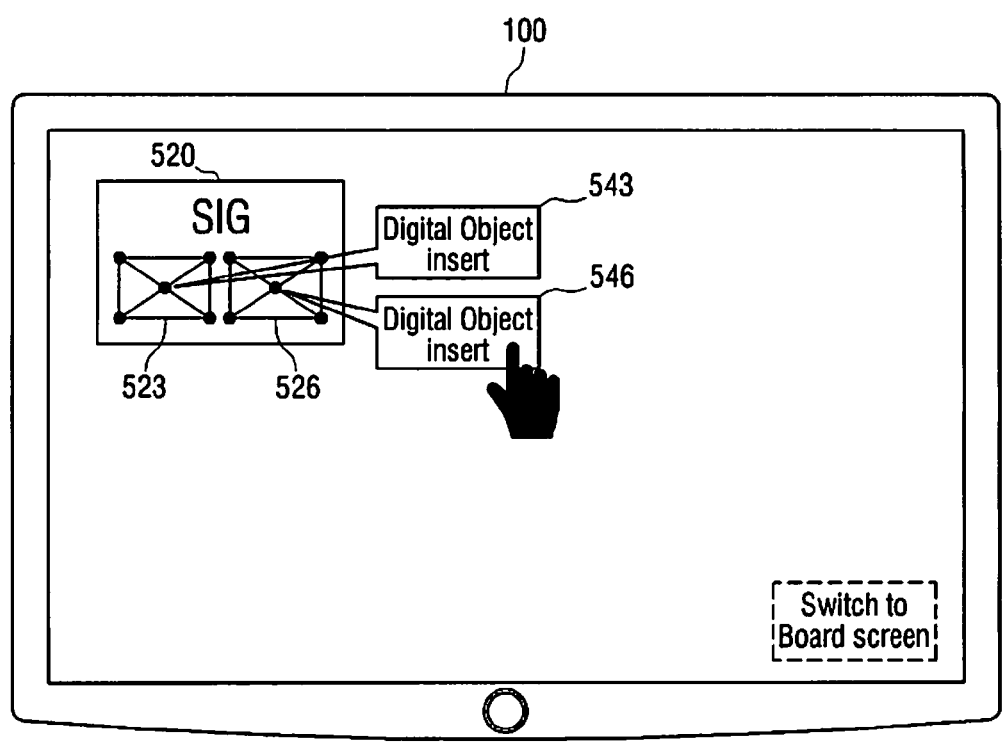

Referring to FIG. 5D, the display apparatus 100 displays on the screen a first Digital Object Insert icon 543 with respect to the first intermediary figure 523 and a second Digital Object Insert icon 546 with respect to the second intermediary figure 526. The Digital Object insert icons 543, 546 are provided to receive a command directing to insert digital objects into the intermediary figures 523, 526. Accordingly, if the user selects the first Digital Object Insert icon 543, the display apparatus 100 carries out the process of inserting a digital object into the first intermediary figure 523. If the user touches the second Digital Object Insert icon 546, the display apparatus 100 carries out the process of inserting a digital object into the second intermediary figure 526.

Figure 5E:
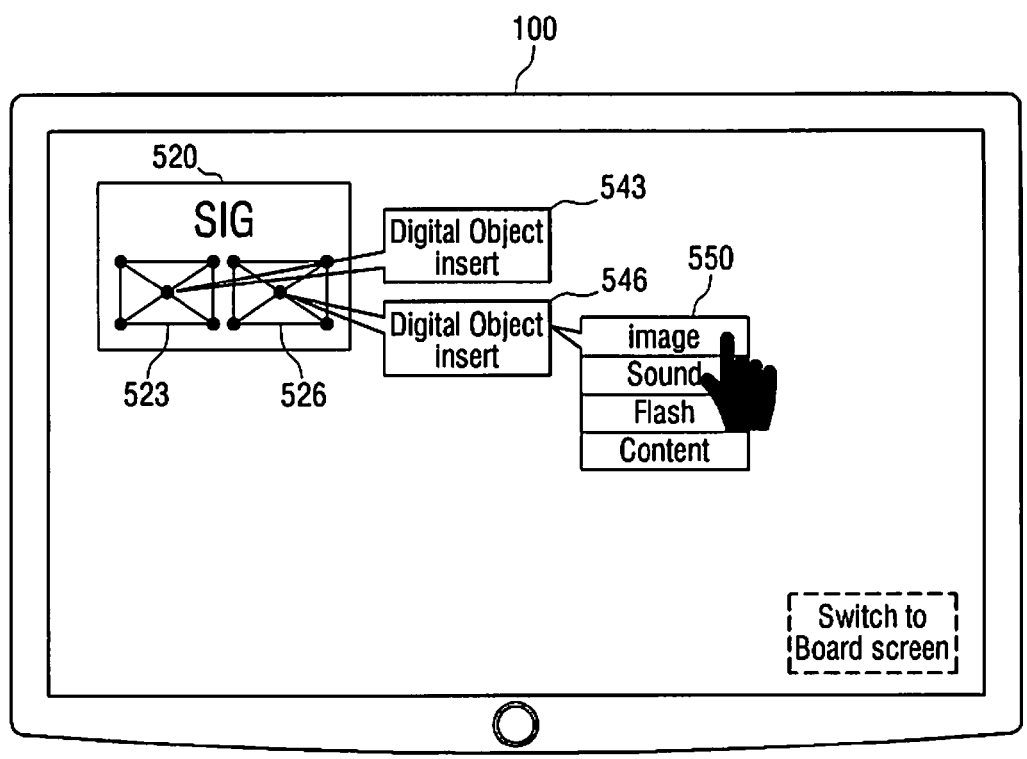

FIG. 5E illustrates the screen on which Digital Object Type menu 550 is displayed. If the user selects the second Digital Object Insert icon 546, the display apparatus 100 displays the Digital Object Type menu 550. Referring to FIG. 5E, the Digital Object Type menu 550 may include an image item, a sound item, a flash item, and a content item.

Figure 5F:
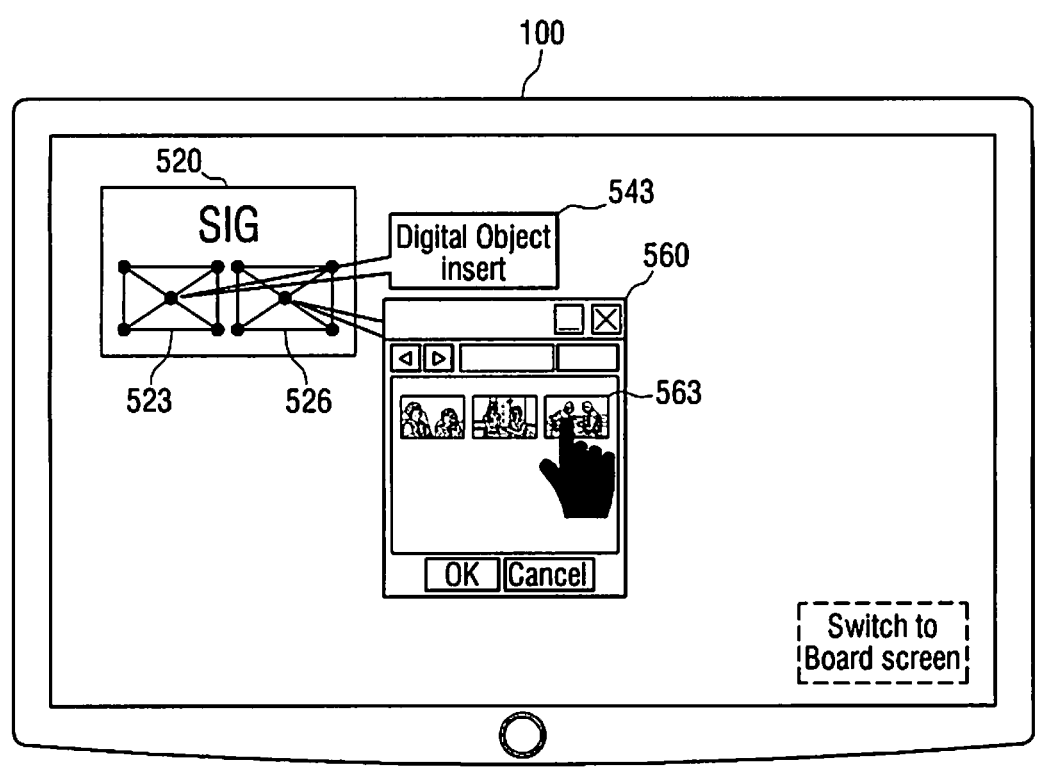

Referring to FIG. 5F, if the user selects the image item from the Digital Object Type menu 550 of FIG. 5E, the display apparatus 100 displays an Image Object Select window 560. If the user selects an image object 563 from the Image Object Select window 560, the display apparatus 100 inserts the selected image object 563 into a location where the second intermediary figure 526 is displayed.

Figure 5G:
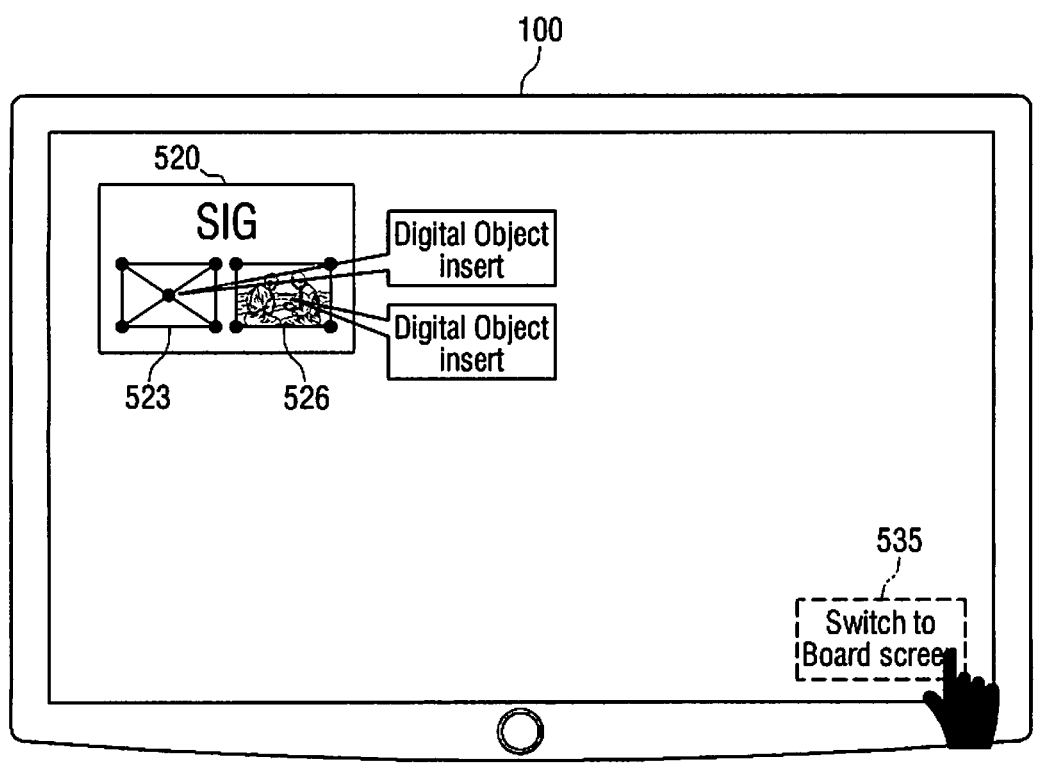

FIG. 5G illustrates the screen on which the selected image object 563 is inserted into the location where the second intermediary figure 526 is displayed. As explained above, if the user selects the 'Switch to Board Screen' button 535 after the selected image object 563 is inserted into the location where the second intermediary figure 526 is displayed, the display apparatus 100 finishes generating of the digital content.

Figure 5H:
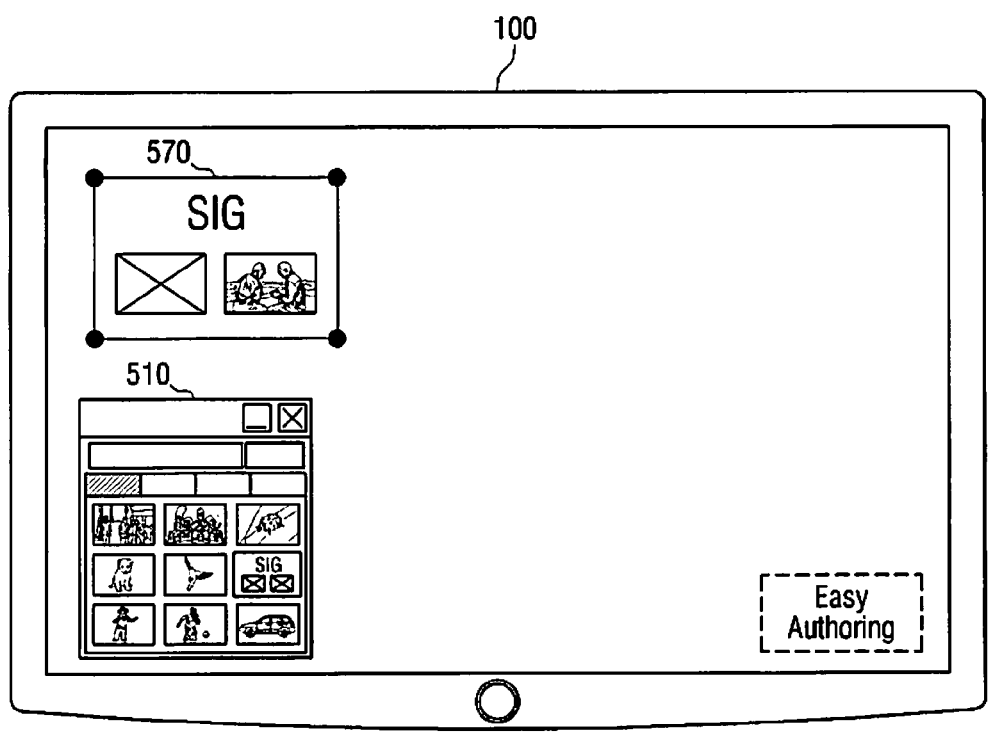
Figure 5I:
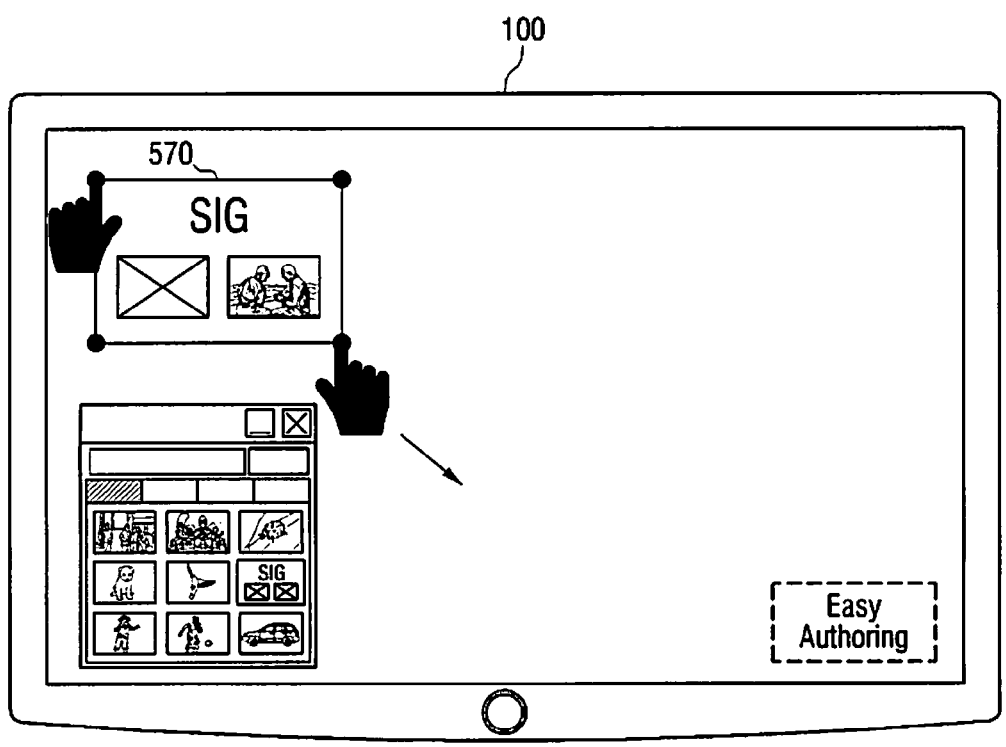

FIG. 5H illustrates a situation in which the digital content 570 in which the image object is inserted is displayed. Referring to FIG. 5I, the user may adjust the size of the digital content 570 by touching a corner of the digital content 570 to move the corner.

Figure 5J:
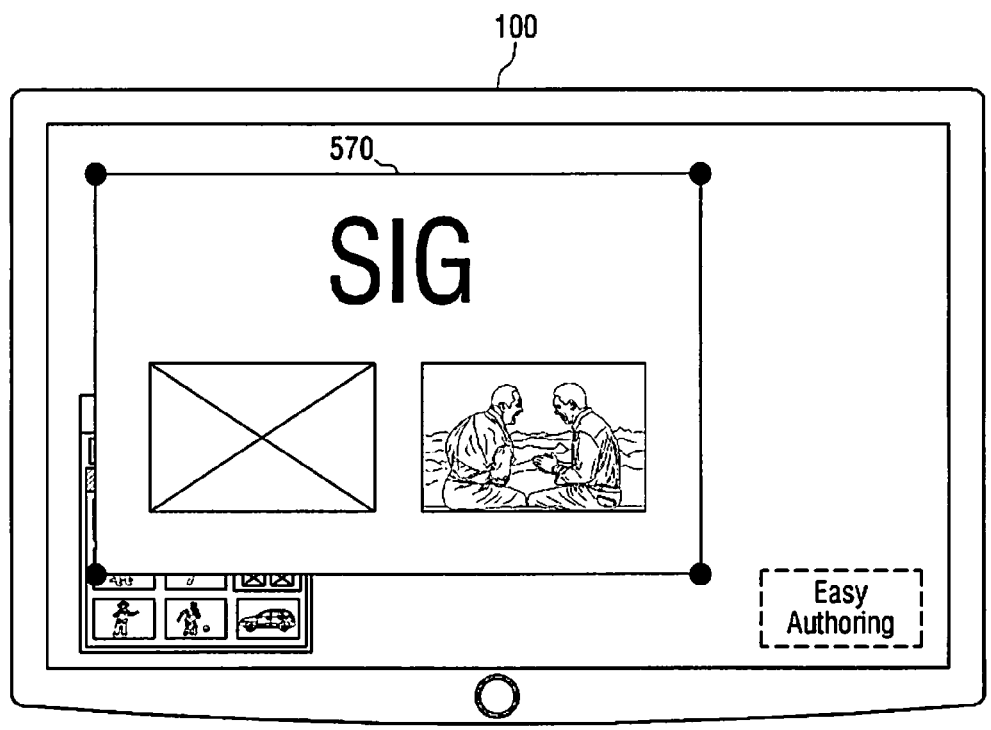

Referring to FIG. 5J, if the user increases the size of the digital content 570 by touching the corner, the display apparatus 100 increases the size of the digital content 570 and displays the digital content 570 in the increased size. Since the image object is grouped with the digital content, the image object may be enlarged in proportion to the size of the digital content 570.

By the processes explained above, the display apparatus 100 receives a previously-stored image and generates digital content using the received image. Accordingly, the user can generate digital content on the display apparatus 100 based on the previously-stored image.

Referring to FIGS. 6A to 6E, the process of receiving an image drawn by the user touch operation with respect to the touch screen and generating content using the received image will be explained below. FIGS. 6A to 6E illustrate the process of receiving an image drawn by the user touch operation with respect to the touch screen and generating content using the received image, according to an embodiment. The display apparatus 100 in this example is provided with a touch screen function.

Figure 6A:
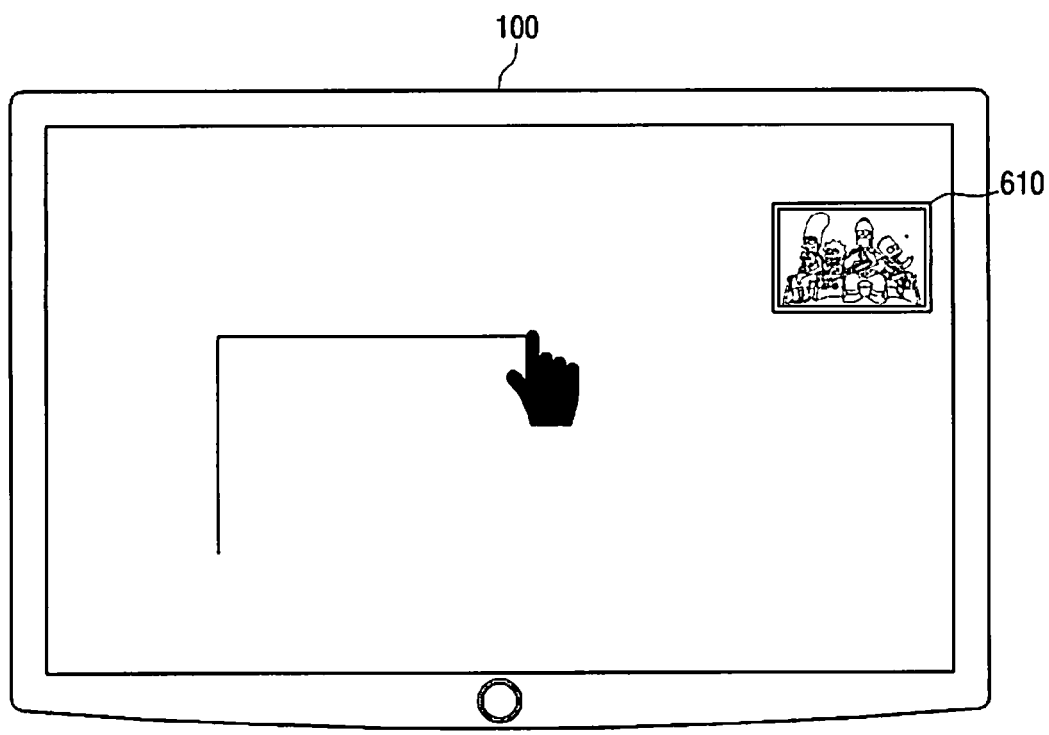
FIGS. 6A to 6E illustrate the process of receiving an image drawn by user touch selection with respect to the touch screen and generating content using the received image, according to an embodiment of the present invention.

FIG. 6A illustrates the screen on which a specific image object 610 is displayed. Referring to FIG. 6A, the display apparatus 100 displays the picture drawn by the user touch operation on the screen.

Figure 6B:
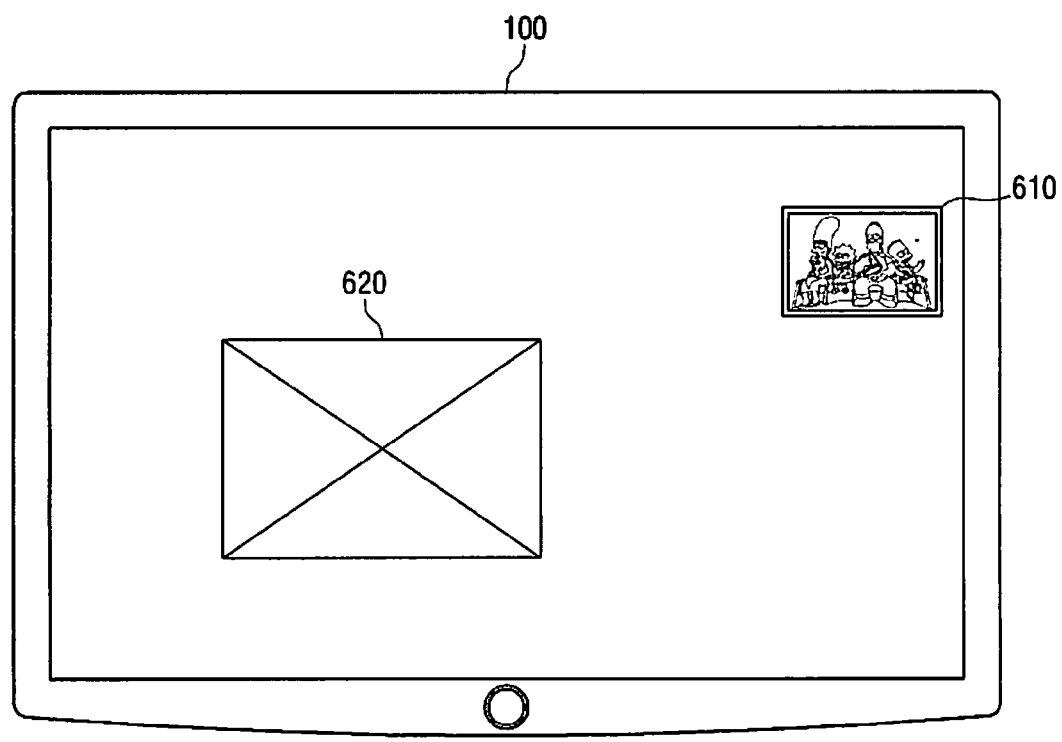

Referring to FIG. 6B, an image 620 drawn by the user touch is displayed on the screen. In this state, the display apparatus 100 automatically perceives that the drawn image 620 corresponds to the intermediary figure. Alternatively, the display apparatus 100 may perceive the intermediary figure on receipt of specific selection.

Figure 6C:
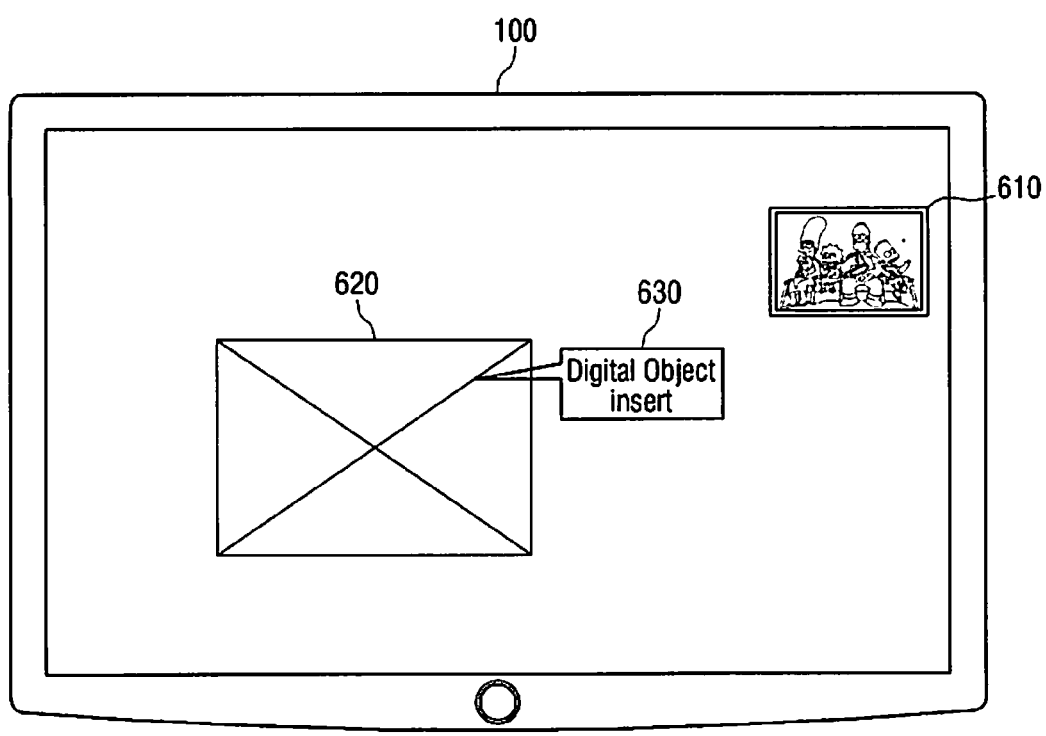

After that, as illustrated in FIG. 6C, the display apparatus 100 perceives the drawn image 620 as the intermediary figure and displays a Digital Object Insert icon 630 with respect to the perceived intermediary figure.

Figure 6D:
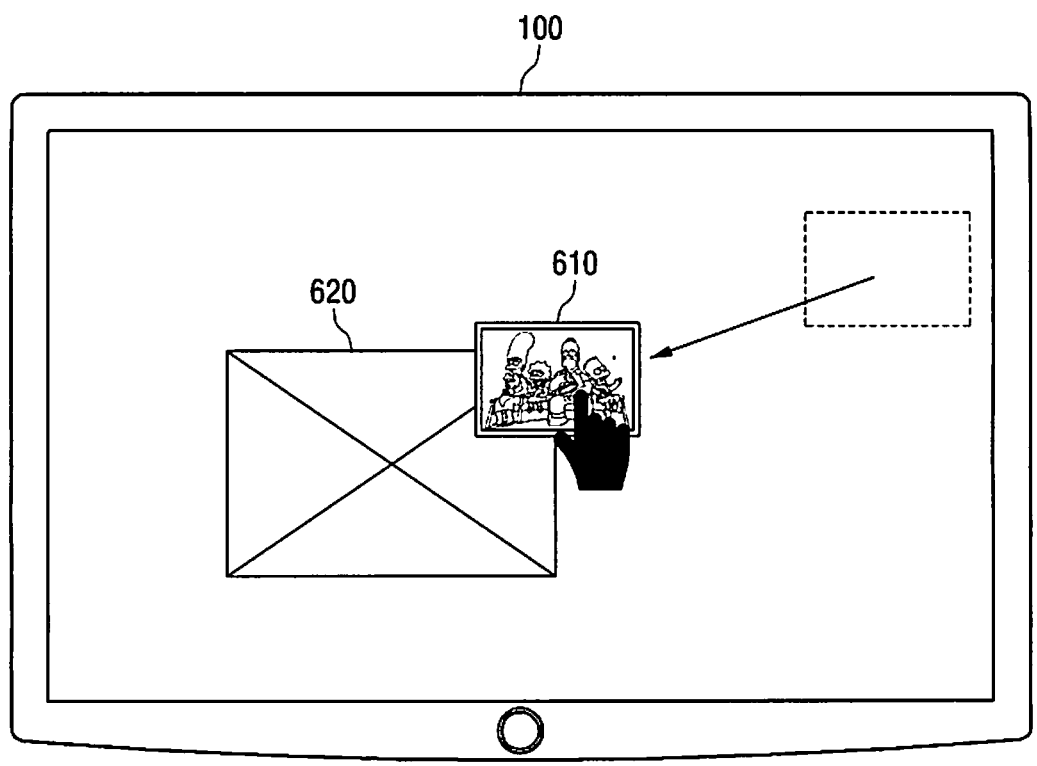

Referring to FIG. 6D, if the user drags & drops the specific image object 610 into the drawn image 620, the display apparatus 100 inserts the specific image object 610 into the drawn image 620.

Figure 6E:
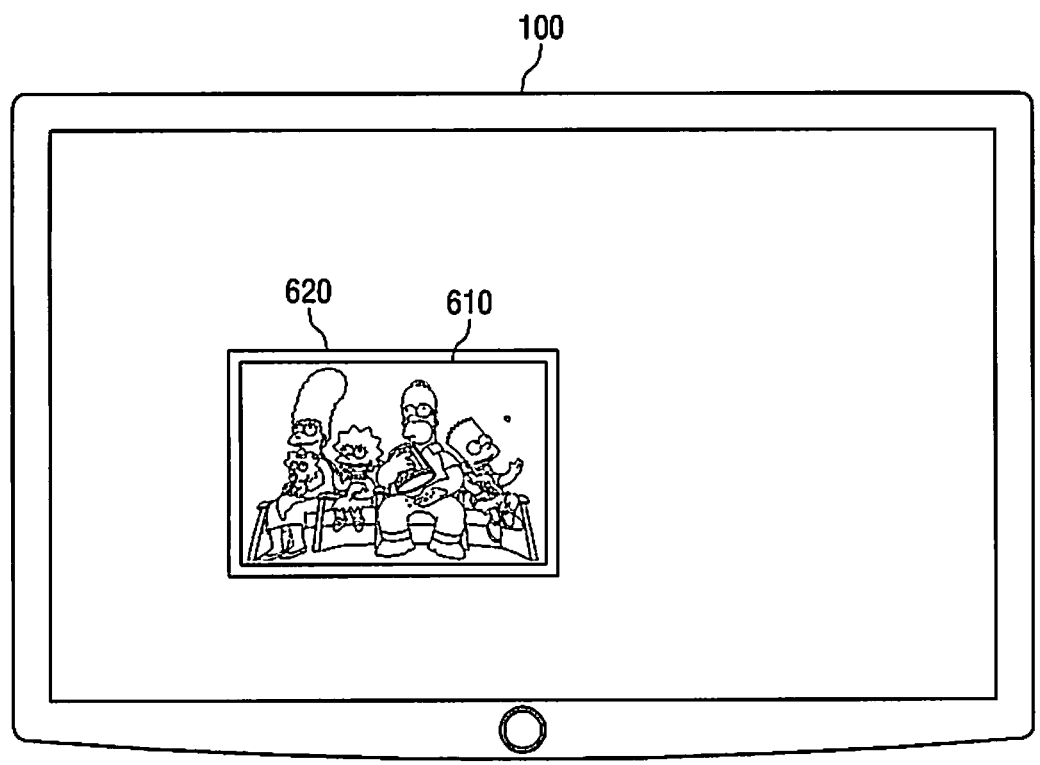

Accordingly, as illustrated in FIG. 6E, the display apparatus 100 displays the specific image object 610 within the drawn image 620.

By the processes explained above, the display apparatus 100 receives an image drawn by the user touch operation and generates digital content using the received image. Accordingly, the user can generate digital content on the display apparatus 100 based on the image drawn by the user using the touch screen.

The process of receiving an image 710 drawn by the user touching a touch screen of an external device, and generating content using the received image will be explained with reference to FIGS. 7A to 7E. FIGS. 7A to 7E illustrate the process of receiving an image 710 drawn by the user touching a touch screen of an external device, and generating content using the received image. The external device 700 in this example includes a touch screen function. The external device 700 may be an electronic book device, a tablet PC, or a PDA.

Figure 7A:
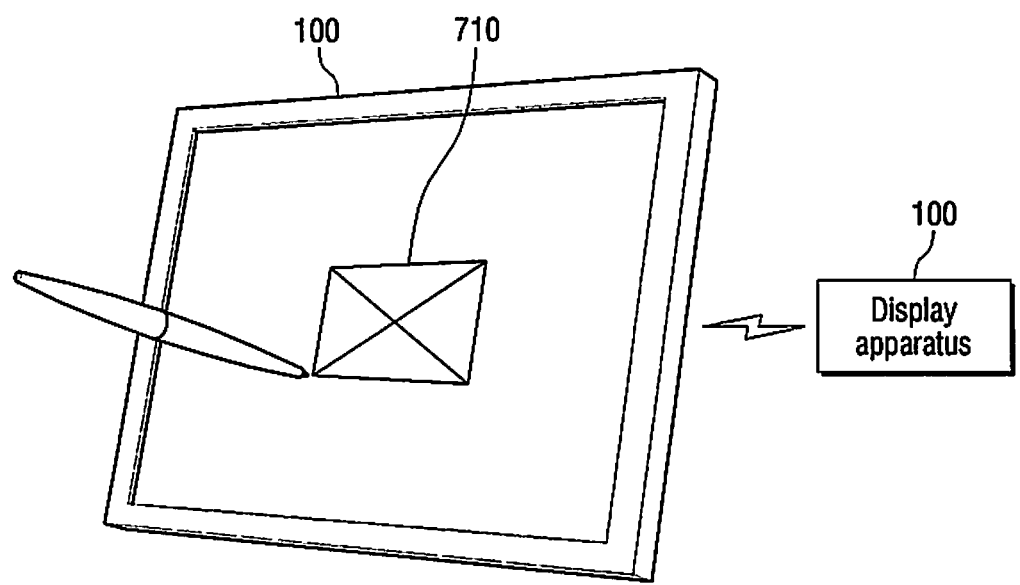
FIGS. 7A to 7E illustrate the process of receiving an image drawn by the user touching a touch screen of an external device, and generating content using the received image.

FIG. 7A illustrates an image 710 drawn by user touch operation on the touch screen of the external device 700. The external device 700 displays the image 710 drawn by the user touch operation and transfers the drawn image 710 to the display apparatus 100.

Figure 7B:
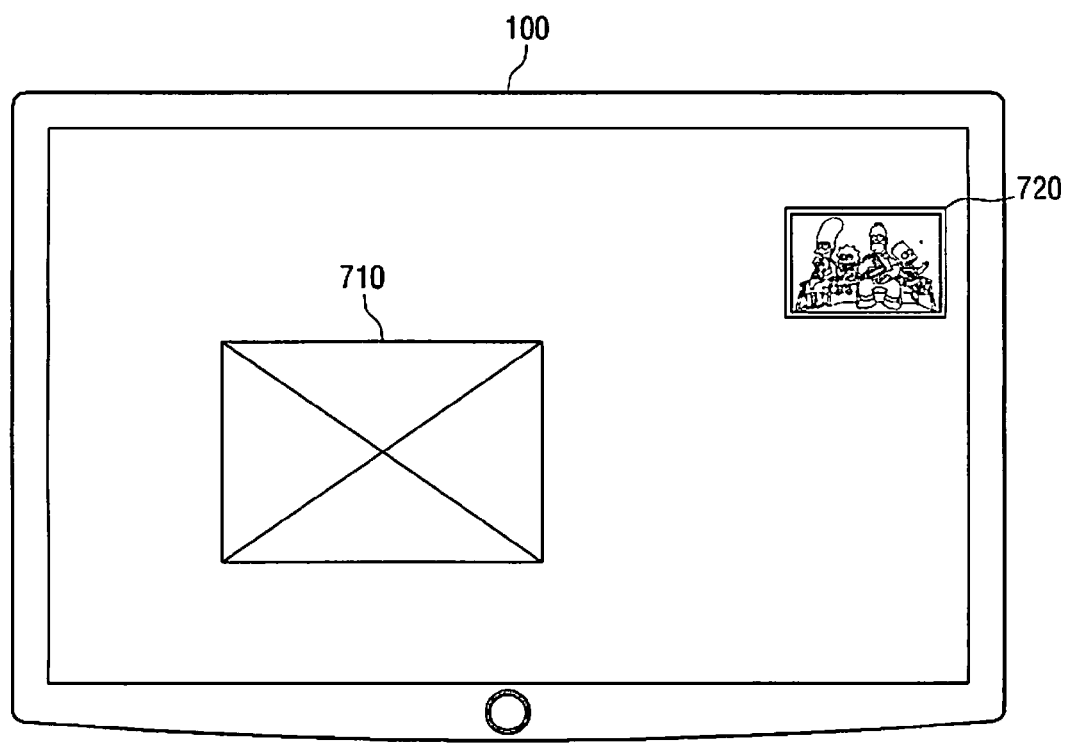

Referring to FIG. 7B, the display apparatus 100 displays the image 710 received from the external device 700 on the screen. Additionally, a specific image object 720 is displayed on the screen of the display apparatus 100. In such a state, the display apparatus 100 automatically perceives that the drawn image 710 corresponds to the intermediary figure. That is, without requiring a separate operation, the display apparatus 100 automatically analyzes the shape of the drawn image 710 and perceives that the drawn image 710 corresponds to the intermediary figure based on the analyzed result.

Figure 7C:
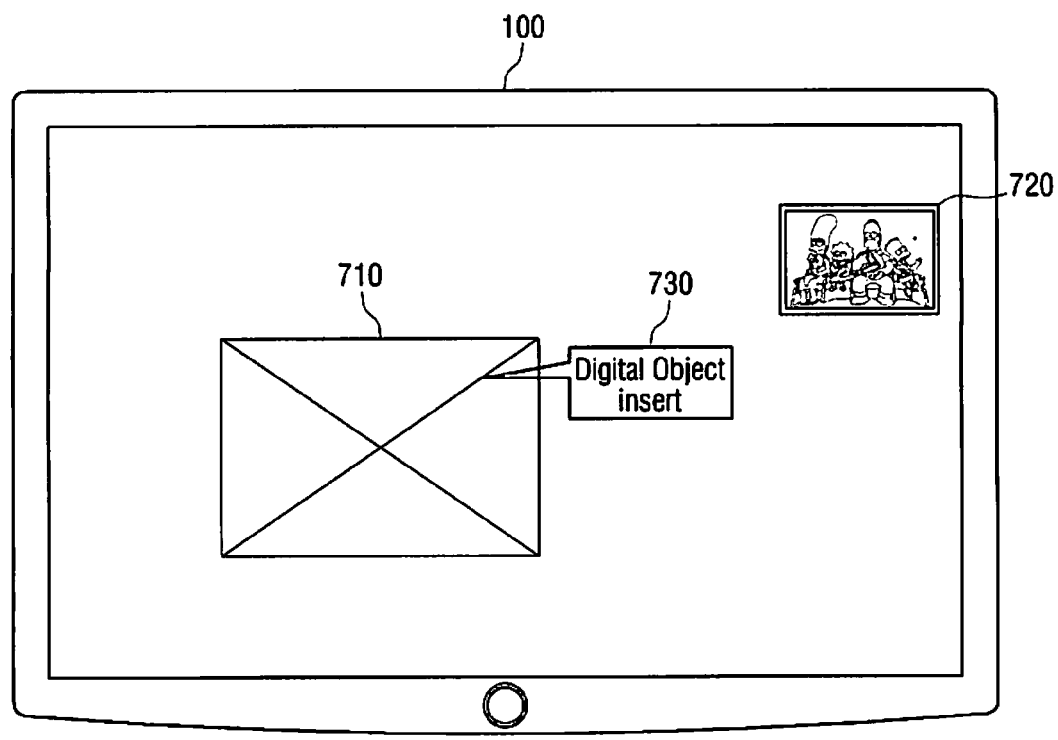

After that, as illustrated in FIG. 7C, the display apparatus 100, on perceiving the received image 710 as the intermediary figure, display a Digital Object Insert icon 730 with respect to the perceived intermediary figure.

Figure 7D:
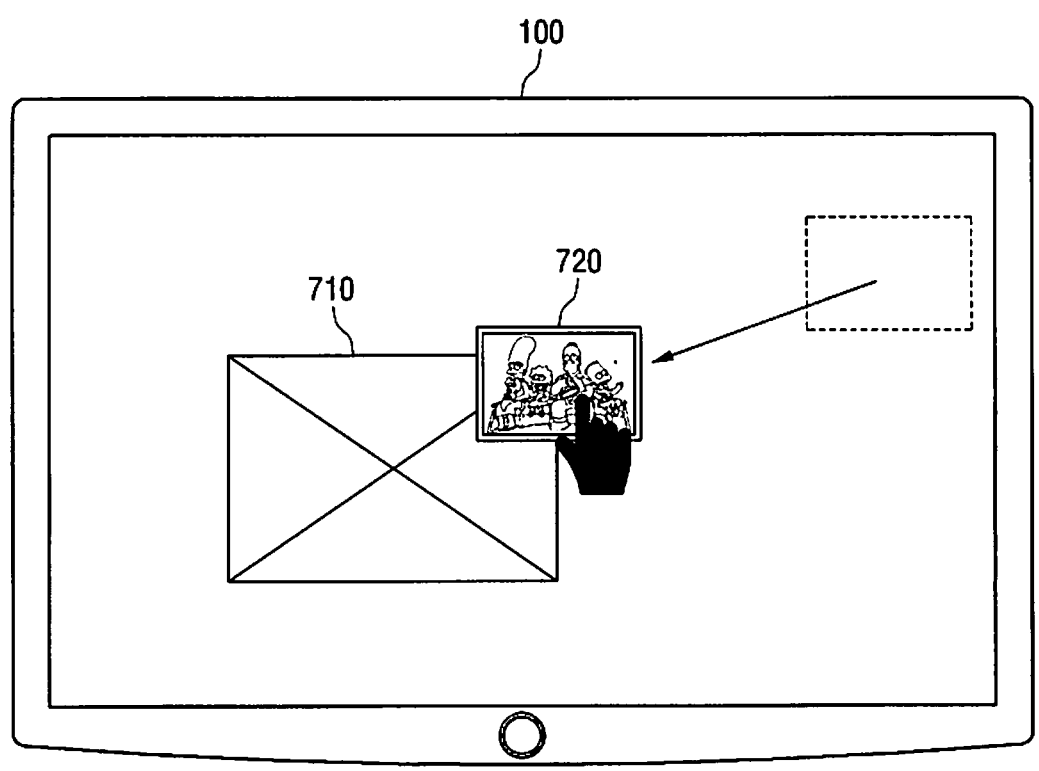

Referring to FIG. 7D, if the user drags & drops the specific image object 710 into the received image 710, the display apparatus 100 inserts the specific image object 720 into the received image 710.

Figure 7E:
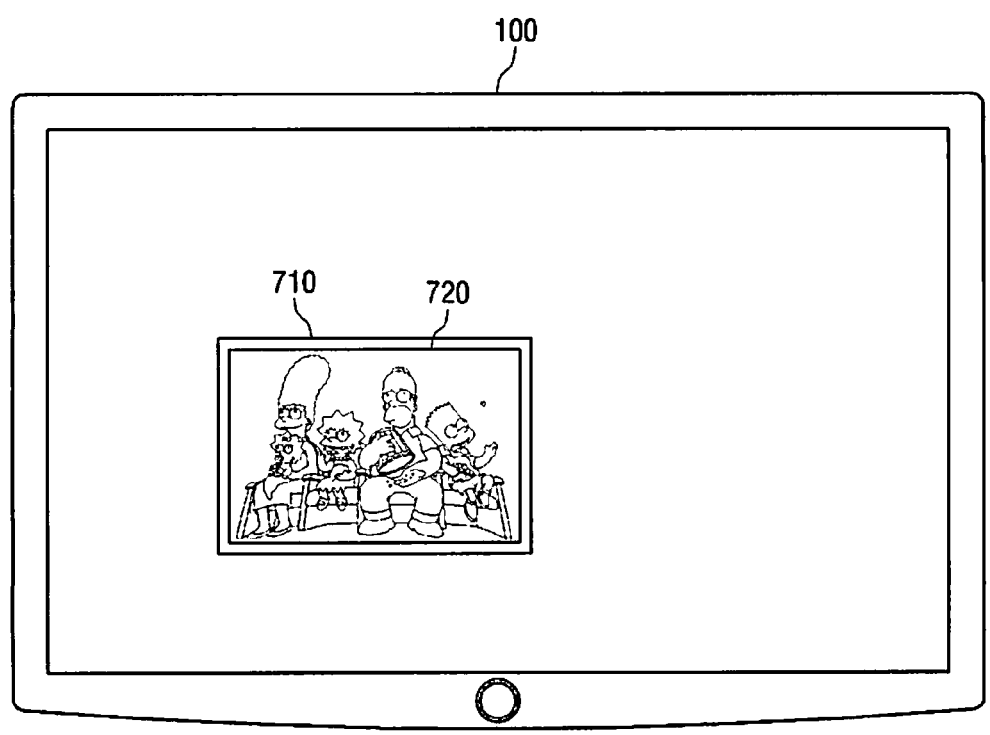

Accordingly, as illustrated in FIG. 7E, the display apparatus 100 displays the specific image object 720 within the received image 710.

By the processes explained above, the display apparatus 100 receives an image drawn by the user touch operation from the external device 700 and generates digital content using the received image. Accordingly, the user can generate digital content on the display apparatus 100 based on the image drawn by the user using the touch screen of the external device 700.

An example of generated digital content will be explained below with reference to FIGS. 8A to 9B. FIGS. 8A to 8D illustrate a base image 800 of the digital content and completed digital content 860, according to an embodiment.

Figure 8A:
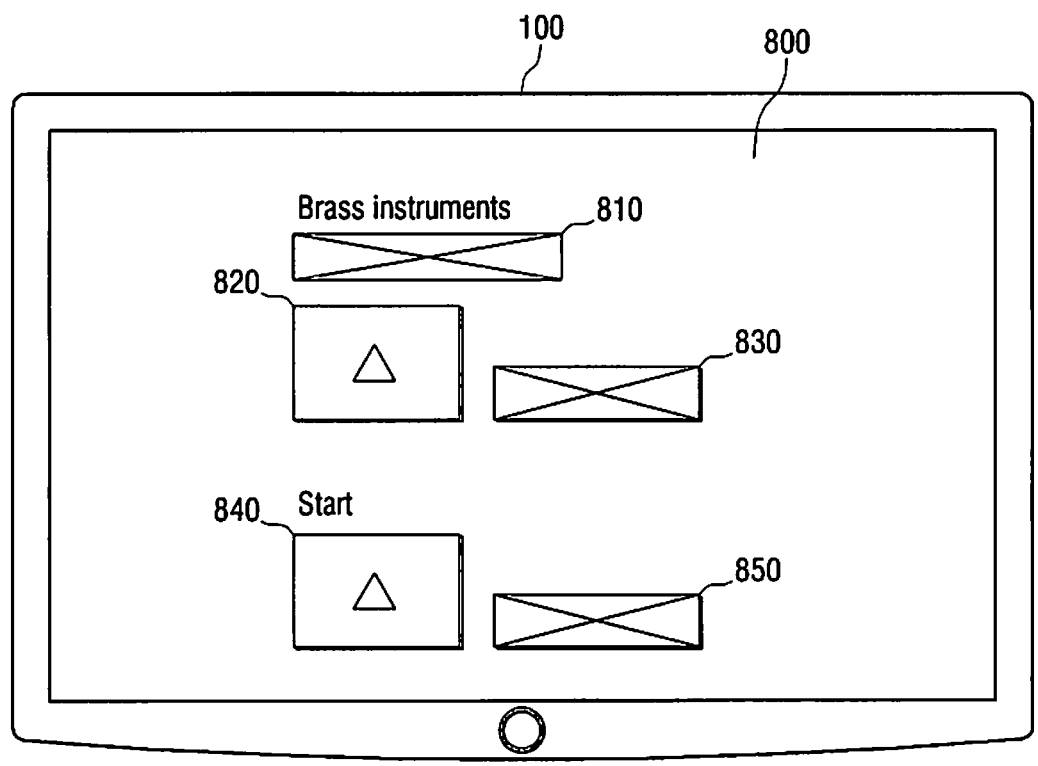
FIGS. 8A to 8D illustrate a base image of the digital content and completed digital content 860, according to an embodiment of the present invention.

FIG. 8A illustrates the screen on which the base image 800 of the digital content is displayed. Referring to FIG. 8A, the base image 800 of the digital content includes a first intermediary figure 810, a second intermediary figure 820, a third intermediary figure 830, a fourth intermediary figure 840 and a fifth intermediary figure 850. The first, third and fifth intermediary figures 810, 830, 850 take the form of boxes with letter X marked therein, and the second and fourth intermediary figures 820, 840 take the form of boxes with a triangle marked therein. The box with letter X marked therein indicates that the text is inserted into the intermediary figure, and the box with a triangle marked therein indicates that the video is inserted into the intermediary figure.

Figure 8B:
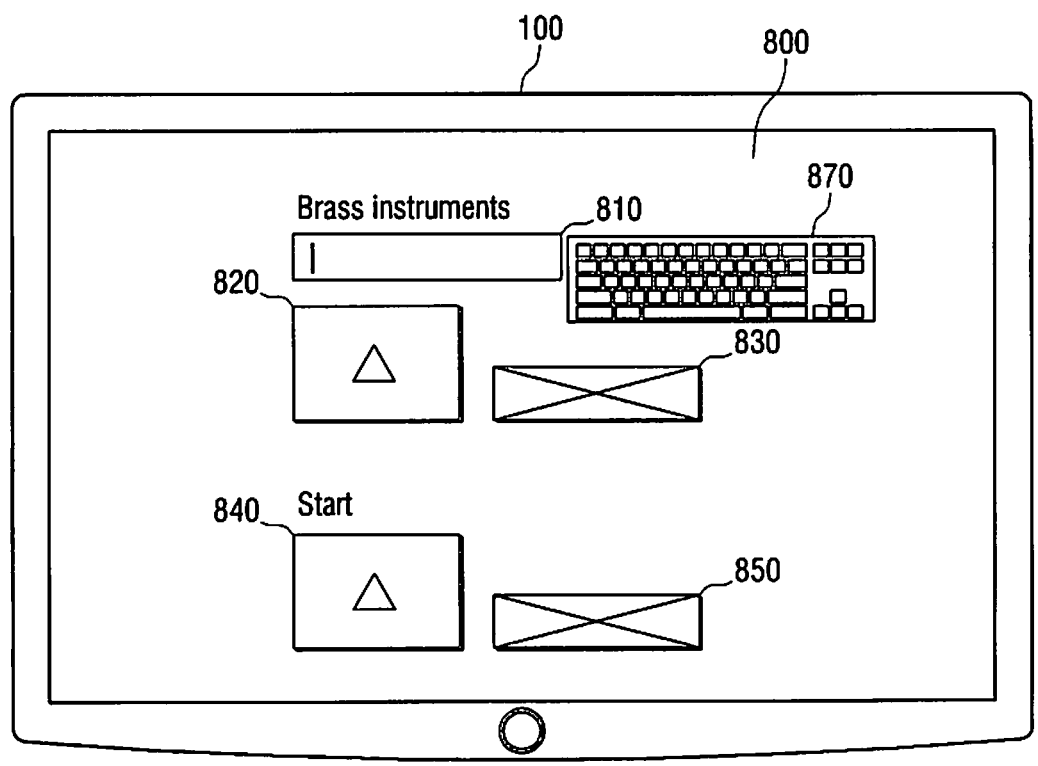

FIG. 8B illustrates a situation in which a text input window and an on-screen keyboard 870 are displayed on the first intermediary figure 810. Referring to FIG. 8B, if the first intermediary figure 810 is selected, the display apparatus 100 converts the first intermediary figure 810 into the text input window and displays the on-screen keyboard 870 to receive text input. Accordingly, the user inputs text into the first intermediary figure 810 using the on-screen keyboard 870. Although the on-screen keyboard 870 is explained as an example of the text input means, this is written only for illustrative purpose. Accordingly, various other means than the keyboard may be used to receive text input.

Figure 8C:
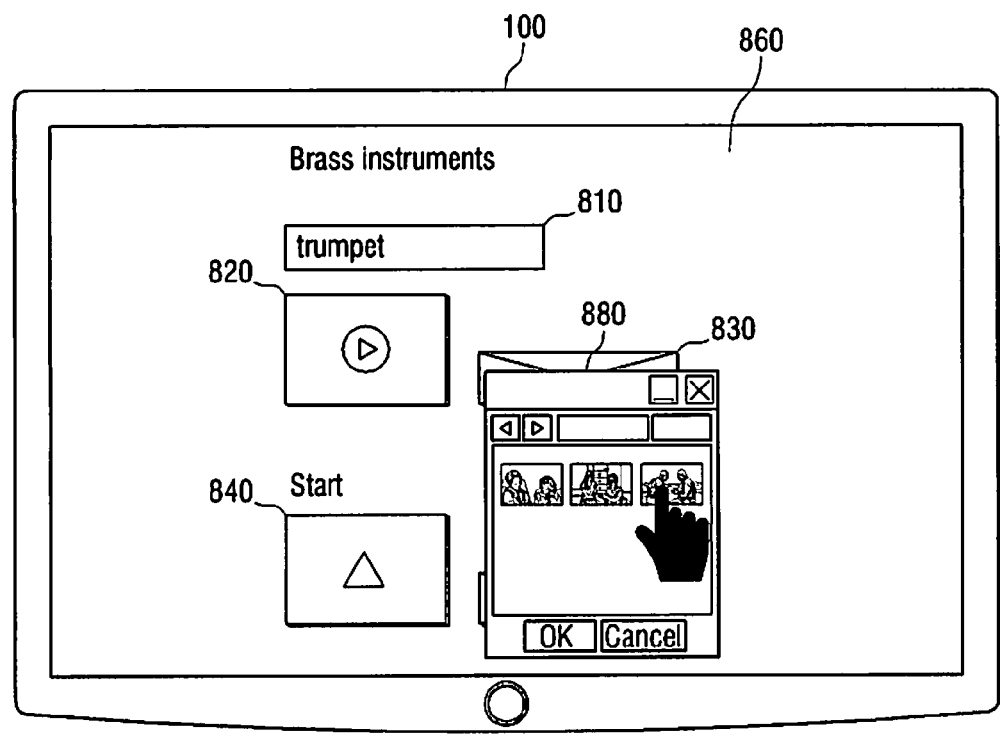
Figure 8D:
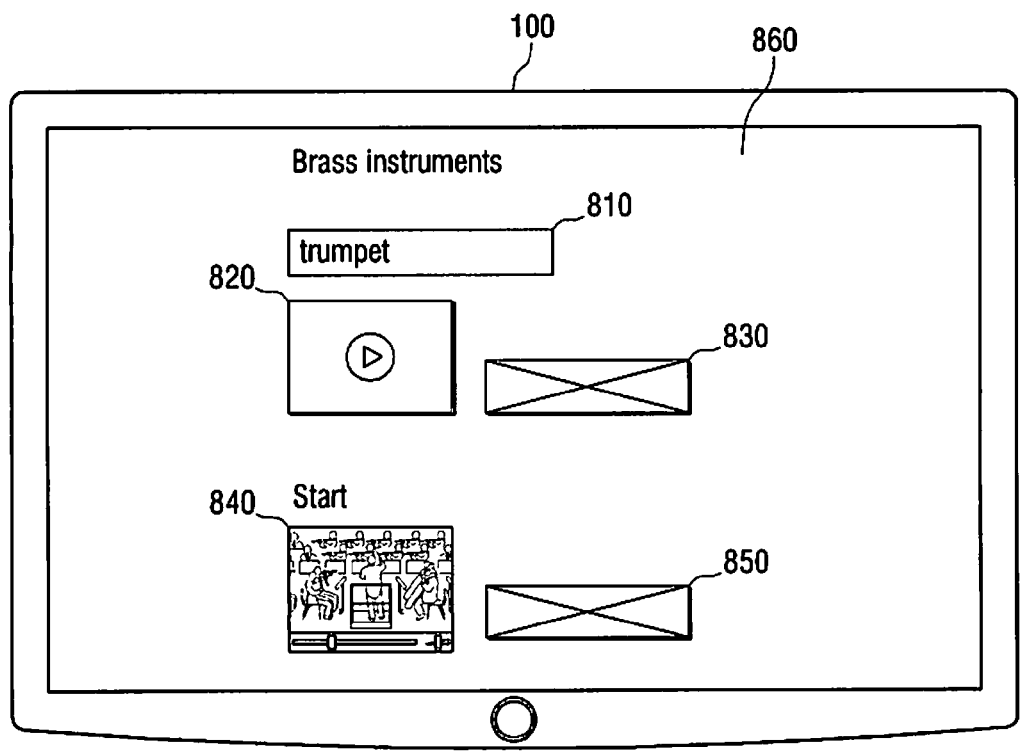

Referring to FIG. 8D, the text object 'trumpet' is inserted into the first intermediary figure 810 of the completed digital content 860.

FIG. 8C illustrates a situation in which a video select window 880 is displayed on the fourth intermediary figure 840. Referring to FIG. 8C, if the fourth intermediary figure 840 is selected, the display apparatus 100 displays the video select window 880 to select a video to be inserted into the fourth intermediary figure 840. Accordingly, through the video select window 880, the user selects a video to be inserted into a location where the fourth intermediary figure 840 is displayed.

Referring to FIG. 8D, the video object is inserted into the fourth intermediary figure 840.

As explained above, since different types of digital objects are selected for insertion according to the types of the intermediary figures, the user is able to set the types of digital objects to insert into the base image 800 of the digital content.

Figure 9A:
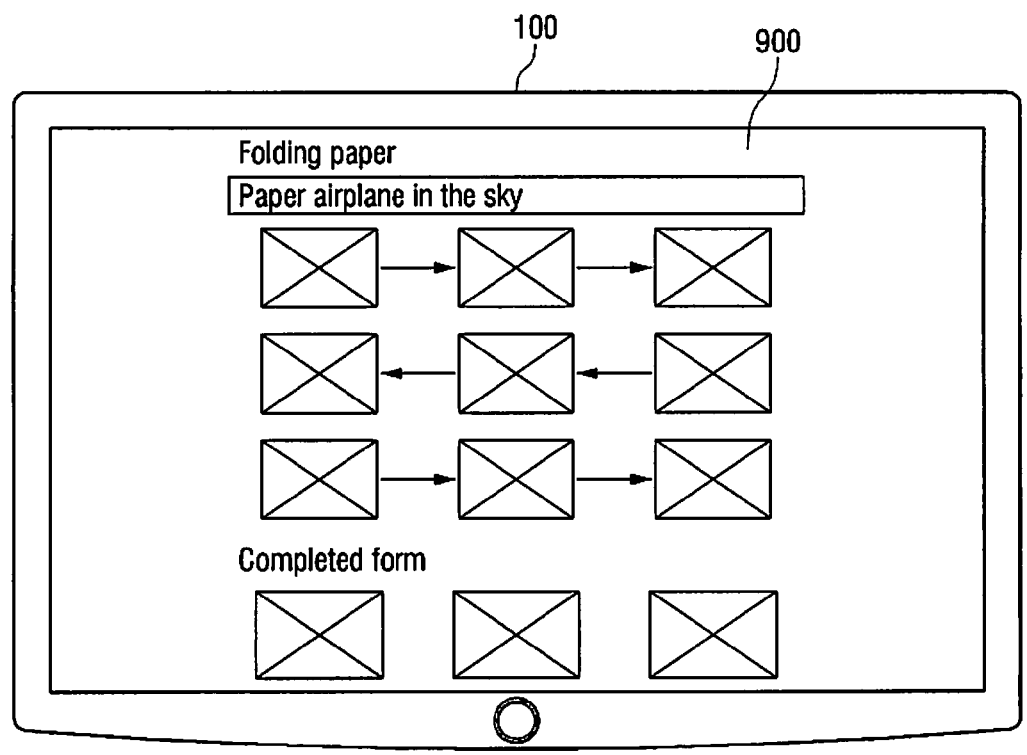
FIGS. 9A and 9B illustrate a base image of the digital content and completed digital content 960 according to an embodiment of the present invention.
Figure 9B:
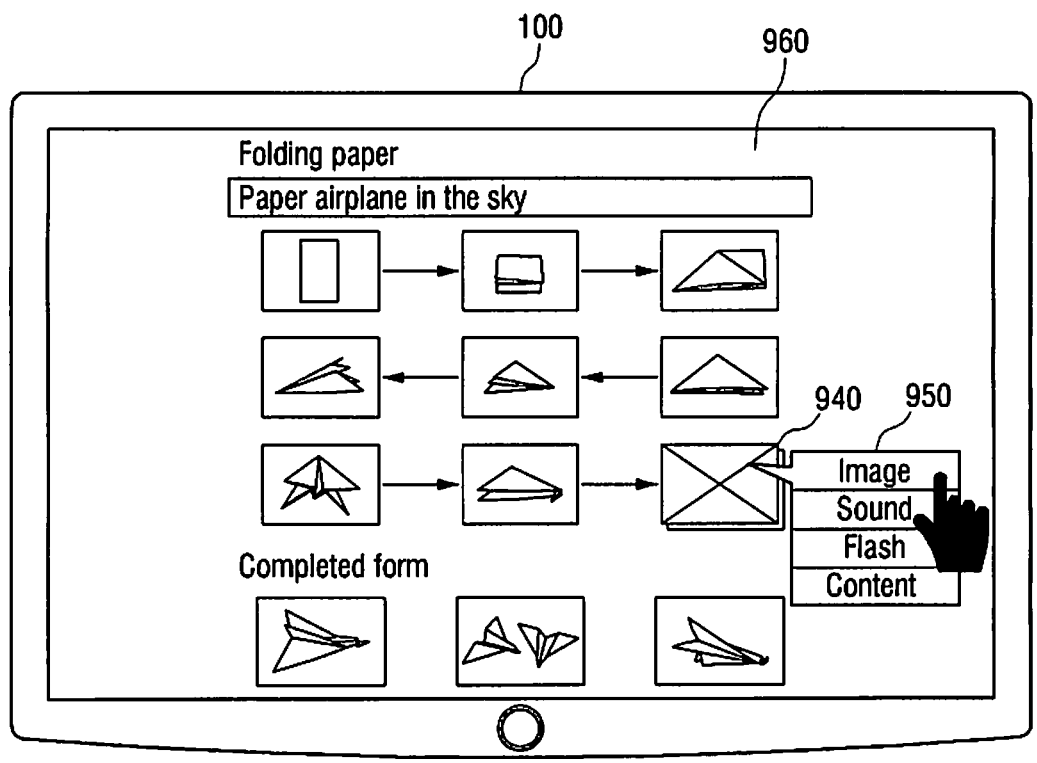

FIGS. 9A and 9B illustrate a base image 900 of the digital content and completed digital content 960 according to an embodiment.

FIG. 9A illustrates the screen on which the base image 900 of the digital content is displayed. Referring to FIG. 9A, the base image 900 of the digital content includes a plurality of intermediary figures therein. The plurality of intermediary figures may be boxes with a letter X marked therein.

Referring to FIG. 9B, photo objects are inserted into the plurality of intermediary figures of the completed digital content 960. Specifically, if the user touches on a specific intermediary figure 940, the display apparatus 100 displays an Object Type menu 950. Then if the user touches on an image item of the Object Type menu 950, the display apparatus 100 inserts the photo object into the specific intermediary figure 940.

As explained above, since the user can select the type of the digital object for insertion into the intermediary figure, the user is able to set the types of digital objects to insert into the base image 800 of the digital content.

Figure 10:
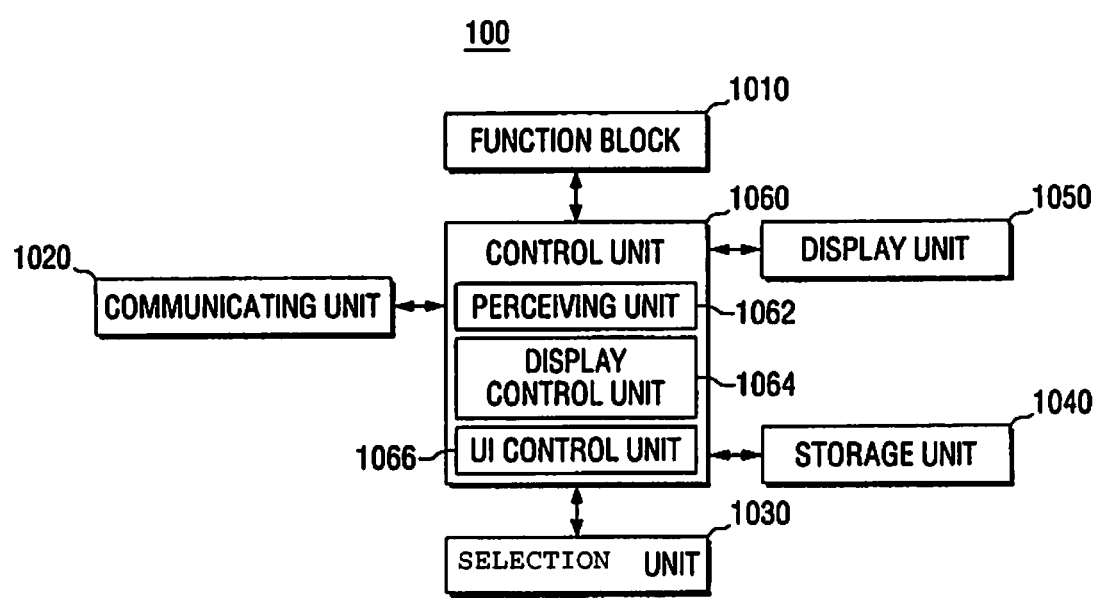
FIG. 10 is a block diagram of the display apparatus according to an embodiment of the present invention.

The display apparatus 100 according to an embodiment will now be explained below with reference to FIG. 10. FIG. 10 is a block diagram of the display apparatus 100 according to an embodiment of the present invention.

Referring to FIG. 10, the display apparatus 100 includes a function block 1010, a communicating unit 1020, a selection unit 1030, a storage unit 1040, a display unit 1050, and a control unit 1060.

The function block 1010 carries out original function of the display apparatus. By way of example, if the display apparatus is an electronic blackboard, the function block 1010 carries out the original function of the electronic blackboard.

The communicating unit 1020 is communicably connected to the external device via mobile communication network, internet, or intranet. The communicating unit 1120 may receive a base image of the digital content to be generated, from the external device.

The manipulating unit 1030 receives user operation to input a user command. Specifically, the selection unit 1030 receives selections corresponding to the commands of the user such as a command directing to select one from among various items displayed on the screen, or the like. The selection unit 1030 may be implemented as a touch screen, button, mouse, or touchpad.

The storage unit 1040 stores therein programs and applications for executing the function of the display apparatus 100. Additionally, the storage unit 1040 may store therein base images of digital content to be generated, digital objects and complete digital content.

The display unit 1050 displays the inputted image. Specifically, the display unit 1050 displays the base image of the digital content to be generated, digital objects and completed digital content.

The control unit 1060 controls the overall operations of the display apparatus 100 according to user selections inputted through the selection unit 1030. Specifically, the control unit 1060 perceives the intermediary figure included in the inputted image, inserts a digital object into a location where the intermediary figure is displayed, and controls so that the digital content, which is the image in which digital object is inserted, is displayed. Additionally, the control unit 1060 controls the display apparatus 100 to provide the functions illustrated in FIGS. 1 to 9B and UI.

Referring to FIG. 10, the control unit 1060 may include a perceiving unit 1062, a display control unit 1064 and a UI control unit 1066.

The perceiving unit 1062 analyzes the form of the inputted image and perceives an existence of an intermediary figure based on the analyzed result. The perceiving unit 1062 extracts location and size information of the intermediary figure if perceiving that the intermediary figure is included.

The display control unit 1064 inserts a digital object into a location where the intermediary figure is displayed, and controls so that the digital object, which is the image in which the digital object is inserted, is displayed. The display control unit 1064 also controls so that the images such as the inputted image are displayed on the screen.

The UI control unit 1066 controls so that the functions illustrated in FIGS. 1 to 9B and UI are provided.

In one embodiment, the display apparatus 100 may be implemented as a variety of devices, including, for example, an electronic blackboard, an electronic table, an electronic book device, a tablet PC, a laptop computer, a mobile phone, or a PDA.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method for generating digital content of a display apparatus, the method comprising:
    receiving an image;
    detecting an intermediary figure included in the received image;
    inserting a digital object into a location where the intermediary figure is displayed; and
    displaying the digital content, which is the image with the inserted digital object,
    wherein the image includes a plurality of types of intermediary figures, and the inserting comprises inserting digital objects of different types depending on the types of the intermediary figures.

2. The method of claim 1, wherein the types of the intermediary figures include at least one of a specific pattern, a specific text, a specific shape, and a specific video.

3. The method of claim 1, wherein the types of the digital objects include at least one of an image, a video, a media file, a text file, a text input window, a shape, link information, a widget and an application program.

4. The method of claim 1, wherein receiving the image comprises receiving an image photographed by an external photographing apparatus from the external photographing apparatus.

5. The method of claim 4, wherein the external photographing apparatus includes one of a digital camera, a wired/wireless webcam, a mobile phone camera, a camcorder, an object image processor, and a scanner.

6. The method of claim 1, wherein receiving the image comprises receiving an image stored at a storage medium built in the display apparatus.

7. The method of claim 1, wherein receiving the image comprises receiving an image stored at an external device from the external device.

8. The method of claim 1, wherein receiving the image comprises receiving an image drawn by a user touch selection.

9. The method of claim 1, wherein the digital content includes the image and the inserted digital object grouped together.

10. The method of claim 9, further comprising un-grouping the image and the inserted digital object of the digital content according to user selection.

11. The method of claim 1, further comprising displaying the received image, and the inserting the digital object comprises:
    displaying a list of a plurality of digital objects to be inserted, if a user inputs a command directing to insert an object with respect to the intermediary figure included in the displayed image; and
    inserting a digital object, which is selected by the user from among the plurality of digital objects of the list of the digital objects, into a location where the intermediary figure is displayed.

12. The method of claim 11, wherein displaying the list comprises:
    displaying a menu of digital object types, if the user inputs a command directing to insert an object with respect to the intermediary figure included in the displayed image; and
    displaying a list of digital objects which correspond to a type selected from the menu of the digital object types.

13. The method of claim 1, further comprising storing the digital content which is the image into which the digital object is inserted.

14. The method of claim 1, further comprising storing an entire screen on which the digital content is displayed.

* * * * *